(12) United States Patent
Ah-Soon et al.

(10) Patent No.: US 8,190,631 B2
(45) Date of Patent: May 29, 2012

(54) QUERY-TIME AND VIEW-TIME SECURITY FOR SEMANTIC LAYER

(75) Inventors: Christian Ah-Soon, Colombes (FR); Marc Ferenczi, Paris (FR); Fabien Kobus, Sevres (FR)

(73) Assignee: Business Objects Software Limited, Dublin (IE)

( * ) Notice: Subject to any disclaimer, the term of this patent is extended or adjusted under 35 U.S.C. 154(b) by 225 days.

(21) Appl. No.: 12/624,843

(22) Filed: Nov. 24, 2009

(65) Prior Publication Data

US 2011/0125772 A1 May 26, 2011

(51) Int. Cl.
*G06F 17/30* (2006.01)
(52) U.S. Cl. ........ 707/769; 707/722; 707/736; 707/765; 707/766; 707/781; 707/784; 707/786; 707/758
(58) Field of Classification Search .................. 707/722, 707/736, 758, 765–766, 769, 781, 784, 786
See application file for complete search history.

(56) References Cited

U.S. PATENT DOCUMENTS

| 7,260,823 | B2 * | 8/2007 | Schlack et al. | 725/9 |
| 7,575,163 | B2 * | 8/2009 | Malik | 235/383 |
| 8,046,798 | B1 * | 10/2011 | Schlack et al. | 725/46 |
| 2005/0154779 | A1 | 7/2005 | Cypher et al. | |
| 2009/0083220 | A1 * | 3/2009 | Petri | 707/3 |
| 2010/0262472 | A1 * | 10/2010 | Gautam et al. | 705/14.1 |
| 2011/0004649 | A1 * | 1/2011 | Nord et al. | 709/202 |

OTHER PUBLICATIONS

Ravi S. Sandhu, "Lattice-Based Access Control Models", Computer, vol. 26, No. 11, Nov. 1993, pp. 9-19 (11 total pages).
"Dorothy E. Denning, Purdue University,"A Lattice Model of Secure Information Flow, Communications of the ACM, May 1976, vol. 19, No. 5, pp. 236-243 (8 total pages).
Torsten Priebe and Gunther Pernul, "Towards OLAP Security Design—Survey and Research Issues", Proc. of the 3rd AMC International Workshop on Data Warehousing and OLAP (DOLAP 2000), Nov. 10, 2000, 8pgs.
Remzi Kirkgoze et al., "A Security Concept for OLAP", Proceedings of the 8th International Workshop on Database and Expert Systems Applications, 1997, ISBN: 0-8186-8147, 1997, IEEE Computer Society, pp. 619-626 (total 8 pages).
Torsten Priebe and Gunther Pernul, "A Pragmatic Approach to Conceptual Modeling of OLAP Security", in Proceedings of the 20th International Conference on Conceptual Modeling, 2001, ISBN: 3-540-42866-6, 14pgs. Gail-Joon Ahn and Michael E. Shin, "Role-Based Authorization Constraints Specification Using Object Constraint Language", Tenth IEEE International Workshops on Enabling Technologies: Infrastructure for Collaborative Enterprises, 2001, ISBN: 0-7695-1269-0, 9pgs.

* cited by examiner

*Primary Examiner* — Frantz Coby
(74) *Attorney, Agent, or Firm* — Buckley, Maschoff & Talwalkar LLC

(57) ABSTRACT

Aspects may include determination of a first security profile associated with a user and an information space, the information space comprising metadata indicating a plurality of objects mapped to logical entities of a hierarchical data structure, reception of a request from the user for an interface for creating queries to the hierarchical data structure, and determination, based on the first security profile, of a first subset of the plurality of objects based on which the user is allowed to create queries. A query is executed based on one or more of the first subset of objects, data of the hierarchical data structure is received in response to execution of the query, a second subset of the received data which the user is allowed to view is determined based on the first security profile, and the second subset of the received data is presented to the user.

33 Claims, 25 Drawing Sheets

| Year | Country | City | Product | Revenue | Number |
|---|---|---|---|---|---|
| 2008 | France | Paris | TV | 1100 | 12 |
| | | | Camera | 300 | 3 |
| | | | Radio | 81 | 9 |
| | | Nice | TV | 220 | 2 |
| | | | Camera | 0 | 0 |
| | | | Radio | 45 | 5 |
| | | Caen | TV | 0 | 0 |
| | | | Camera | 400 | 4 |
| | | | Radio | 27 | 3 |

| Year | Country | City | Product | Revenue | Number |
|---|---|---|---|---|---|
| 2007 | France | Paris | TV | 950 | 9 |
| | | | Camera | 400 | 4 |
| | | | Radio | 140 | 15 |
| | | Nice | TV | 110 | 1 |
| | | | Camera | 100 | 1 |
| | | | Radio | 27 | 3 |
| | | Caen | TV | 200 | 2 |
| | | | Camera | 490 | 5 |
| | | | Radio | 60 | 6 |

*FIG. 12*

| Year | Country | City | Product | Revenue |
|---|---|---|---|---|
| 2008 | France | Paris | TV | 1100 |
| | | | Camera | 300 |
| | | | Radio | 81 |
| | | Nice | TV | 220 |
| | | | Camera | 0 |
| | | | Radio | 45 |
| | | Caen | TV | 0 |
| | | | Camera | 400 |
| | | | Radio | 27 |

| Year | Country | City | Product | Revenue |
|---|---|---|---|---|
| 2007 | France | Paris | TV | 950 |
| | | | Camera | 400 |
| | | | Radio | 140 |
| | | Nice | TV | 110 |
| | | | Camera | 100 |
| | | | Radio | 27 |
| | | Caen | TV | 200 |
| | | | Camera | 490 |
| | | | Radio | 60 |

*FIG. 13*

| Year | Country | | Product | Revenue | Number |
|---|---|---|---|---|---|
| 2008 | France | | TV | 1100 | 12 |
| | | | Camera | 300 | 3 |
| | | | Radio | 81 | 9 |
| | | | TV | 220 | 2 |
| | | | Camera | 0 | 0 |
| | | | Radio | 45 | 5 |
| | | | TV | 0 | 0 |
| | | | Camera | 400 | 4 |
| | | | Radio | 27 | 3 |

| Year | Country | | Product | Revenue | Number |
|---|---|---|---|---|---|
| 2007 | France | | TV | 950 | 9 |
| | | | Camera | 400 | 4 |
| | | | Radio | 140 | 15 |
| | | | TV | 110 | 1 |
| | | | Camera | 100 | 1 |
| | | | Radio | 27 | 3 |
| | | | TV | 200 | 2 |
| | | | Camera | 490 | 5 |
| | | | Radio | 60 | 6 |

*FIG. 14*

| Year | Country | Revenue | Number | City | Revenue | Number | Product | Revenue | Number |
|---|---|---|---|---|---|---|---|---|---|
| 2008 | France | 2173 | 38 | Paris | 1481 | 24 | TV | 1100 | 12 |
| | | | | | | | Camera | 300 | 3 |
| | | | | | | | Radio | | 9 |
| | | | | Nice | | 7 | TV | | 2 |
| | | | | | | | Camera | | 0 |
| | | | | | | | Radio | | 5 |
| | | | | Caen | 427 | 7 | TV | | 0 |
| | | | | | | | Camera | 400 | 4 |
| | | | | | | | Radio | | 3 |

| Year | Country | Revenue | Number | City | Revenue | Number | Product | Revenue | Number |
|---|---|---|---|---|---|---|---|---|---|
| 2007 | France | 2477 | 46 | Paris | 1490 | 28 | TV | 950 | 9 |
| | | | | | | | Camera | 400 | 4 |
| | | | | | | | Radio | | 15 |
| | | | | Nice | | 5 | TV | | 1 |
| | | | | | | | Camera | | 1 |
| | | | | | | | Radio | | 3 |
| | | | | Caen | 750 | 13 | TV | | 2 |
| | | | | | | | Camera | 490 | 5 |
| | | | | | | | Radio | | 6 |

*FIG. 16*

| Year | Country | City | Product | Revenue | Number |
|------|---------|------|---------|---------|--------|
| 2008 | France | Paris | TV | 1100 | 12 |
| | | | Camera | 300 | 3 |
| | | | Radio | 81 | 9 |

| Year | Country | City | Product | Revenue | Number |
|------|---------|------|---------|---------|--------|
| 2007 | France | Paris | TV | 950 | 9 |
| | | | Camera | 400 | 4 |
| | | | Radio | 140 | 15 |

*FIG. 17*

| Year | Country | City | Product | Revenue | Number |
|------|---------|------|---------|---------|--------|
| 2008 | France | Paris | TV | 1100 | 12 |
|      |        |       | Camera | 300 | 3 |
|      |        |       | Radio | 81 | 9 |

| Year | Country | City | Product | Revenue | Number |
|------|---------|------|---------|---------|--------|
| 2007 | France | Paris | TV | 950 | 9 |
|      |        |       | Camera | 400 | 4 |
|      |        |       | Radio | 140 | 15 |

QUERY-TIME AND VIEW-TIME SECURITY FOR SEMANTIC LAYER

BACKGROUND

Business data is typically stored within hierarchical data structures, such as physical tables of a relational database. A user may generate database-language queries to extract desired data from such data structures. However, generation of these queries requires detailed knowledge of the structure and relationships of a data structure as well as familiarity in database programming. Both requirements are beyond the capabilities of the typical business user.

Business Intelligence (BI) tools provide an abstraction layer for shielding end users from the complexity of relational or hierarchical data structures storing business data. An abstraction layer allows end users to query a data structure using entities (i.e., business objects) having intuitive business meanings rather than references to logical entities of the data structure. BI tools may also allow a user to create a report populated with data retrieved from the data structure using such queries.

It is desirable to provide different users with different levels of access to stored business data. Some existing BI tools, such as BusinessObjects XI 3.0, allow an administrator to restrict a user's access to rows, tables, etc. of an underlying hierarchical data structure. Moreover, BusinessObjects XI 3.0 allows an administrator to restrict a user's access to one or more business objects of an associated abstraction layer. As a result, the user is prevented from creating a query using the business object, from retrieving data corresponding to the business object from the underlying hierarchical data structure, and from viewing data which is associated with the business object in the underlying hierarchical data structure.

Finer control over object-based access restrictions is desired. For example, it may be desirable to independently control each of a user's ability to create a query using a business object, to retrieve data corresponding to the business object from an underlying hierarchical data structure, and to view data which is associated with the business object in the underlying hierarchical data structure. Such control may be used to allow a user to create a report using a business object but also to prevent the user from viewing data which is associated with the business object. Such control may be further used to allow the user to run a query of the report to retrieve the data associated with the business object, even though the user is not allowed to view the data.

Increased flexibility in object-based access control may facilitate beneficial use cases other than and/or in addition to those described above.

BRIEF DESCRIPTION OF THE DRAWINGS

FIG. 12 depicts a populated report according to some embodiments.

FIG. 13 depicts a populated report according to some embodiments.

FIG. 14 depicts a populated report according to some embodiments.

FIG. 16 depicts a populated report according to some embodiments.

FIG. 17 depicts a populated report according to some embodiments.

FIG. 19 depicts a populated report according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
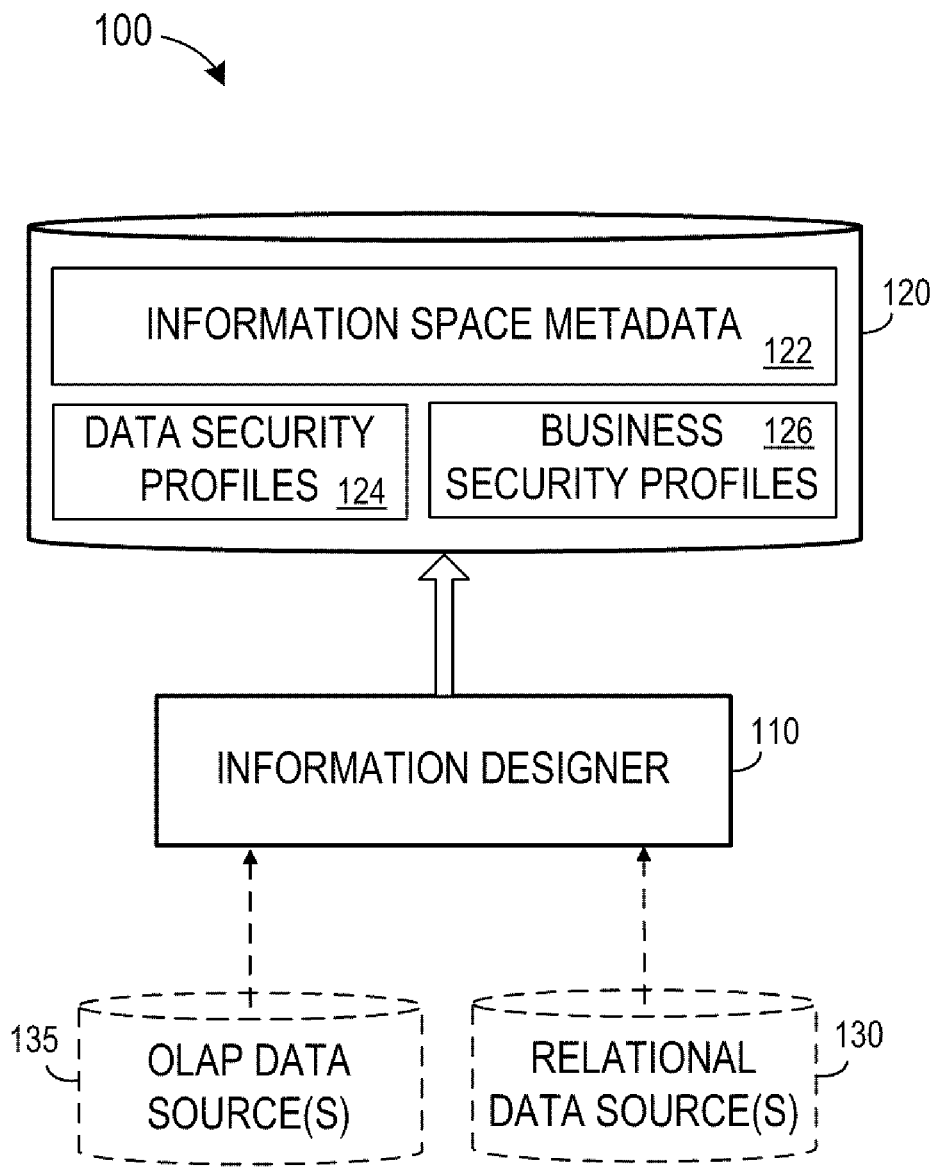
FIG. 1 is a block diagram of a design-time system according to some embodiments.

System 100 of FIG. 1 comprises an architecture to create security profiles associated with information space metadata according to some embodiments. The information space metadata indicates a set of objects mapped to logical entities of a hierarchical data structure, or information space.

For example, information space metadata 122 may describe a respective set of objects associated with each one of relational data source(s) 130 and Online Analytical Processing (OLAP) data source(s) 135. Each of relational data source(s) 130 may comprise any query-responsive data source or sources of relational data that are or become known, including but not limited to a structured-query language (SQL) relational database management system. Each of OLAP data source(s) 135 may comprise any query-responsive data source or sources of multidimensional data that are or become known.

The set of objects associated with a data source may comprise an abstraction layer associated with that data source. Commonly-assigned and co-pending U.S. patent application Ser. No. 12/463,702 describes such an abstraction layer, referred to therein as a semantic layer. Briefly, the "business objects" of an abstraction layer represent business entities, such as customers, products, stores, time, sales figures, etc.

represented in the data of a data source. Business objects may be classified as dimensions (along which one may want to perform an analysis or report), details (e.g., additional information on dimensions), and measures (e.g., indicators, most often numeric, whose value can be determined for a given combination of dimension values).

Each of data security profiles 124 may be associated with the data foundation of the semantic layer. In a relational data source, the data foundation includes the tables of the data source, their constituent columns, and joins therebetween that are used in the semantic layer. One of security profiles 124 may therefore be associated with a user in order to define the user's access to data foundation elements of the relational data source to which the one security profile 124 is also associated. According to some embodiments, data security profiles 124 are used to modify queries to their associated data source(s). Such modification according to some embodiments will be described in detail below.

Each of business security profiles 126 may be associated with a relational data source 130 or an OLAP data source 135. More particularly, a business security profile 126 defines access restrictions to objects of information space metadata 122 which are associated with a hierarchical data structure. For example, a business security profile 126 associated with a user and an information space may specify which objects of the information space may be used by the user to create a query of the information space.

In some embodiments, a business security profile 126 associated with a user and an information space uses objects of the information space to specify data of the underlying hierarchical data structure which the user is not allowed to view. A business security profile 126 may also, independently, use objects of the information space to indicate data of the underlying hierarchical data structure which is not to be retrieved by a query executed under the user's logon.

By virtue of the foregoing, embodiments may allow a user to create a report query even if the user is not allowed to view the data to be retrieved by the query. Conversely, embodiments may allow a user to view data associated with an object even if the user is not allowed to create a query using the object. Embodiments may facilitate other flexible and heretofore unavailable access scenarios.

Information designer 110 may comprise a software application operable to create data security profiles 124 and business security profiles 126. Information designer 110 may comprise a standalone, Web-based or other application executing on any computing device or devices that are or become known.

Information designer 110 may also be operated to create information space metadata 122 according to some embodiments. Dashed lines are used in FIG. 1 to indicate that actual connections between information designer 110 and data source(s) 130/135 are not required before, during, or after generation of information space metadata 122, data security profiles 124 and business security profiles 126.

The elements of system 100 may be implemented by any suitable combination of hardware and/or software. Each element may be located remotely from one or more other elements. More than one element may be implemented in a single device and/or software package.

Figure 2:
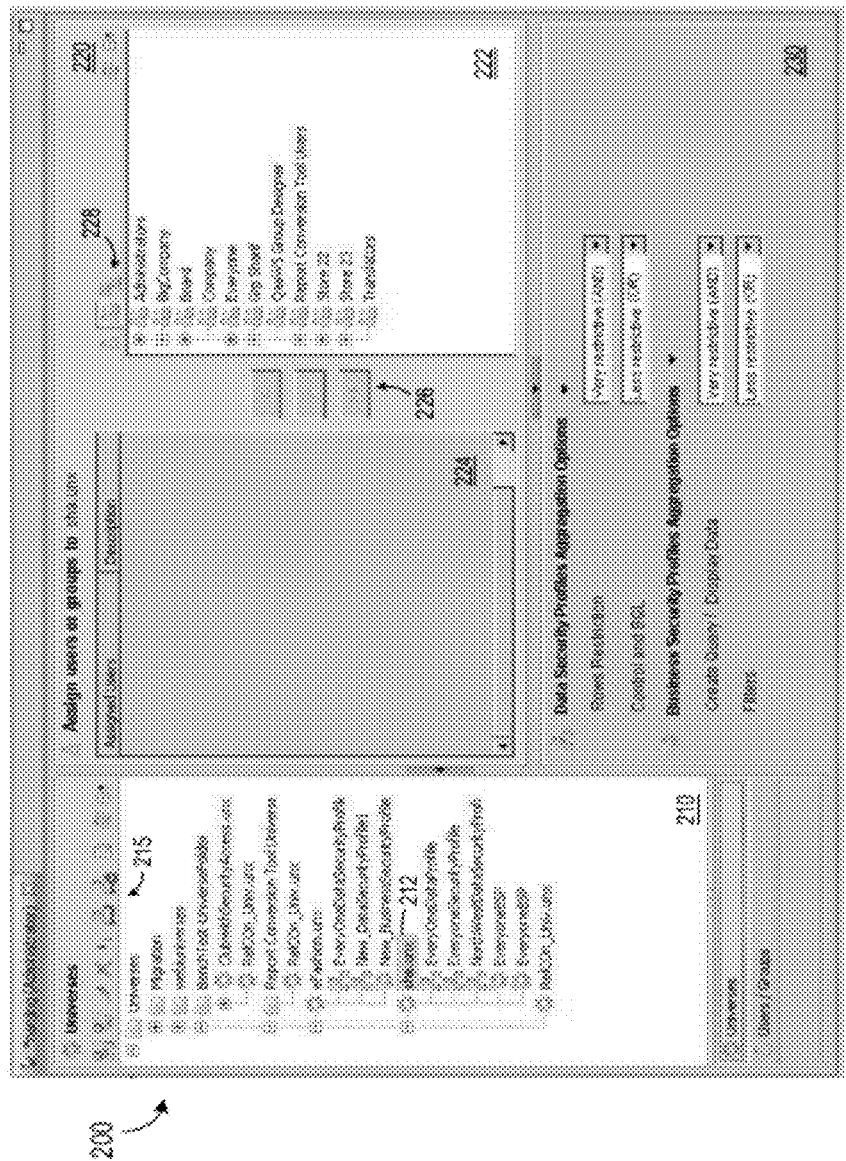
FIG. 2 is a representation of an interface to define security profiles according to some embodiments.

FIG. 2 is an outward view of interface 200 provided by information designer 110 according to some embodiments. In some embodiments, interface 200 is a panel within a Web page provided to a client device by information designer 110. Interface 200 is displayed on the client device and manipulated by an administrator to create security profiles according to some embodiments.

Interface 200 and the other interfaces, dialogs, panels, windows and tabs are presented herein for the purpose of describing features of some embodiments. Embodiments are not to be deemed limited thereto.

As shown in FIG. 1, security profiles 124/126 and information space metadata 122 may be stored in storage device 120, which may comprise a central management system ("CMS"). Accordingly, each of security profiles 124/126 may be associated with an information space represented by information space metadata 122. As mentioned above, information space metadata 122 may include metadata describing more than one information space.

A user may initially connect to storage device 120 in order to populate interface 200 with the information spaces (e.g., Universes) and security profiles stored therein. In this regard, information designer 110 may require a user to enter user credentials and to identify a CMS which stores the information space metadata and security profiles of interest. In some embodiments, more than one CMS may be identified, and a separate tabbed panel is opened corresponding to each CMS.

Interface 200 provides a "universe-centric" view oriented to administration of security profiles. Interface 300 of FIG. 3, to be described below, provides a principal-centric view oriented to displaying security profiles assigned to a principal (i.e., user or group).

Interface 200 includes universe panel 210 displaying a tree list of universes stored in the current CMS. A list of security profiles attached to a universe is displayed below each universe. Toolbar 215 may be used to invoke functions for creating a new data security profile, creating a new business security profile, editing a selected security profile, deleting a selected security profile, and running a query of a selected universe via a query panel. The query panel and the returned data will be secured by the security profiles assigned to the current user as will be described in detail below. Similar functions may be available via context menus displayed upon right-clicking a security profile in panel 210.

Window 222 of principals panel 220 displays all principals in the CMS and window 224 displays those principals explicitly assigned to currently-selected profile 212 in universe panel 210. Buttons 226 may be used to assign and un-assign principals to/from the currently-selected profile. Buttons 228 control the display of principals in window 222. Principals may be displayed in a flat list, in a flat group list with each principal listed below each group to which they belong (as shown in FIG. 2), or in group hierarchies with each principal listed below each group to which they belong.

Aggregation panel 230 provides aggregation options to define how data security profiles and business security profiles aggregate for the universe selected in the universe panel 210. Aggregation panel 230 is empty if no universe is selected. If the selected universe is relational, the panel includes data security profile aggregation options and business security profile aggregation options. If the selected universe is OLAP-based, the panel includes only business security profile aggregation options.

Figure 3:
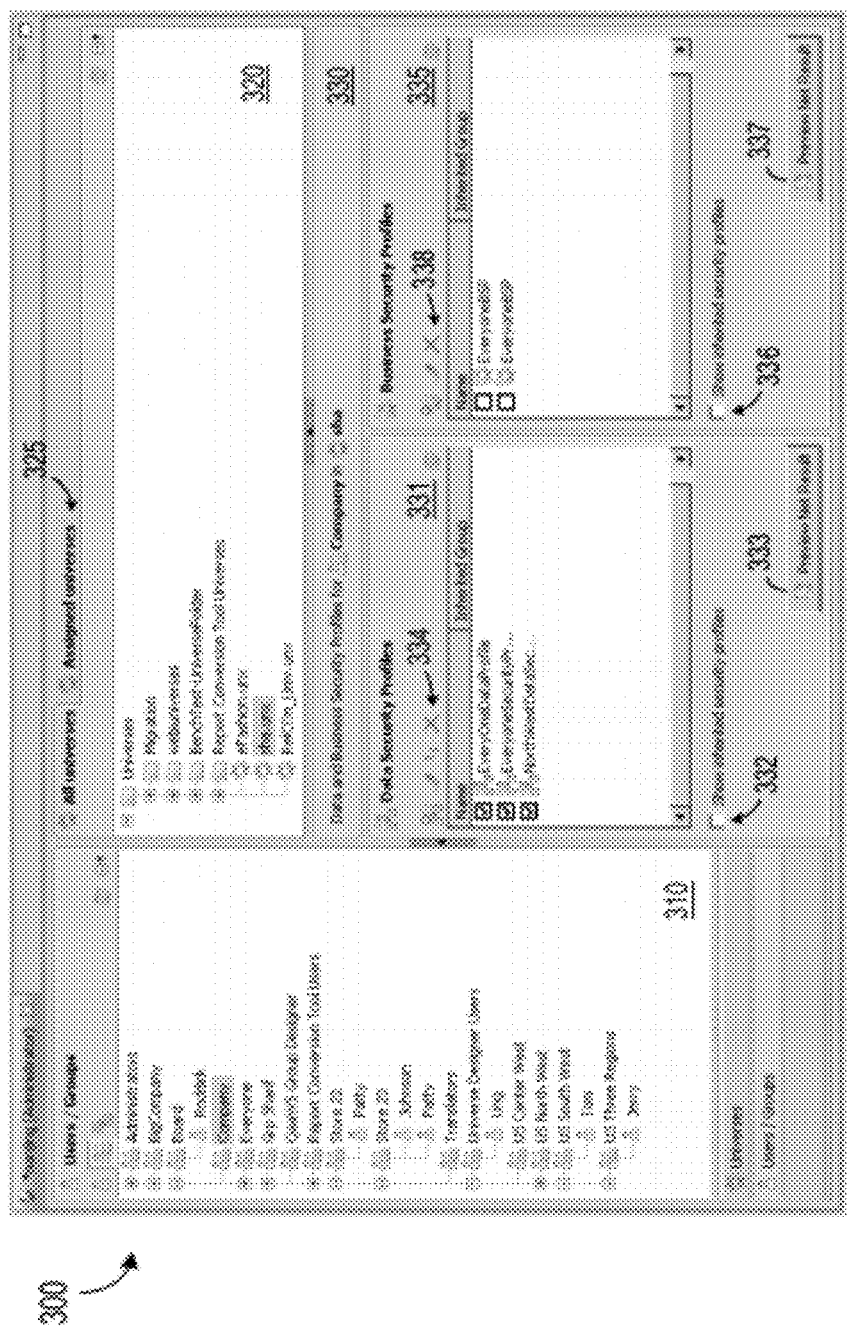
FIG. 3 is a representation of an interface to define security profiles according to some embodiments.

Principal-centric interface 300 of FIG. 3 includes principals panel 310 to display all principals in the CMS. Principals panel 310 is used to navigate into the CMS' users and groups structure and to select users and groups therefrom. As described with respect to panel 222, principal panel 310 may display principals in a flat list, in a flat group list with each principal listed below each group to which they belong, or in group hierarchies with each principal listed below each group to which they belong.

Universe panel 320 displays universes published in the CMS. Universe panel 320 includes tabs 325 for displaying all published universes or only those universes for which at least one data security profile or business security profile has been assigned to the principal currently selected in principals panel 310.

Assigned profiles panel 330 includes data security profile window 331 and business security profile window 335. Data security profile window 331 lists data security profiles of the universe selected in panel 320, and business security profile window 335 lists business security profiles of the universe selected in panel 320.

A check-box in front of each data or business security profile indicates whether a listed profile is explicitly assigned to the principal selected in principal panel 310. A checkbox may be checked/unchecked to explicitly assign/un-assign an associated profile to the principal selected in principal panel 310.

Show Inherited Security Profiles checkboxes 332 and 336 determine, respectively, whether the list of data security profiles and the list of business security profiles includes those that are inherited from other groups by the currently-selected principal. If checked, the name of the group from which a profile is inherited is displayed along with the profile.

Preview Net Result buttons 333 and 337 may be selected to display, for the currently-selected principal, the net result of all security parameters that apply to the user for the selected universe. These security parameters therefore represent, for the selected principal and universe, an effective data security profile (or business security profile). For example, the effective business security profile takes into account all business security profiles displayed in window 335 that apply to the principal (i.e., those explicitly assigned to the principal and those inherited by the principal) and the business security profile aggregation rules associated with the selected principal and universe.

Toolbars 334 and 338 may be used to invoke functions for creating new security profiles, editing a selected security profile, and deleting a selected security profile. A user may right-click on a security profile displayed in window 331 or 335 to access a context menu providing similar functions.

The functions available via interfaces 200 and 300 may depend on the rights of the accessing user. For example, one or more editing, assigning, and creating functions may be unavailable to certain users. In some embodiments, certain users may be able to view the information provided in interfaces 200 and 300 but are not permitted to edit any information stored in any CMS.

As mentioned above, creation of a new data security profile or editing of an existing data security profile may be initiated using a toolbar button or context menu of interfaces 200 or 300. Dialog 400 of FIG. 4 may be displayed as a result. An administrator may use dialog 400 to create, view and edit a data security profile according to some embodiments.

Tabs 410 of dialog 400 detail the data security profile for a relational universe. Tabs 410 include Connection, Controls, SQL, Rows and Table Mapping tabs. Connection, Controls and SQL parameters of a subject data security profile which differ from the universe's default parameters may be highlighted.

Connection tab 412 is used to define alternate secured connections for a user. Connection tab 412 displays the name of the attached universe, its description and its data foundation if the universe is relational. When this user runs a query on top of the universe, the connection defined in Connection tab 412 is used instead of the default connection of the universe. Alternate connections window 414 lists all connections used by the universe. Edit button 416 allows a user to select an alternate connection or change the alternate connection associated with a selected original connection.

For relational universes, the alternate connections may be selected from RDBMS connections contained in the CMS Connections folder. Remove button 418 is used to remove an alternate connection associated to the selected original connection.

Figure 4:
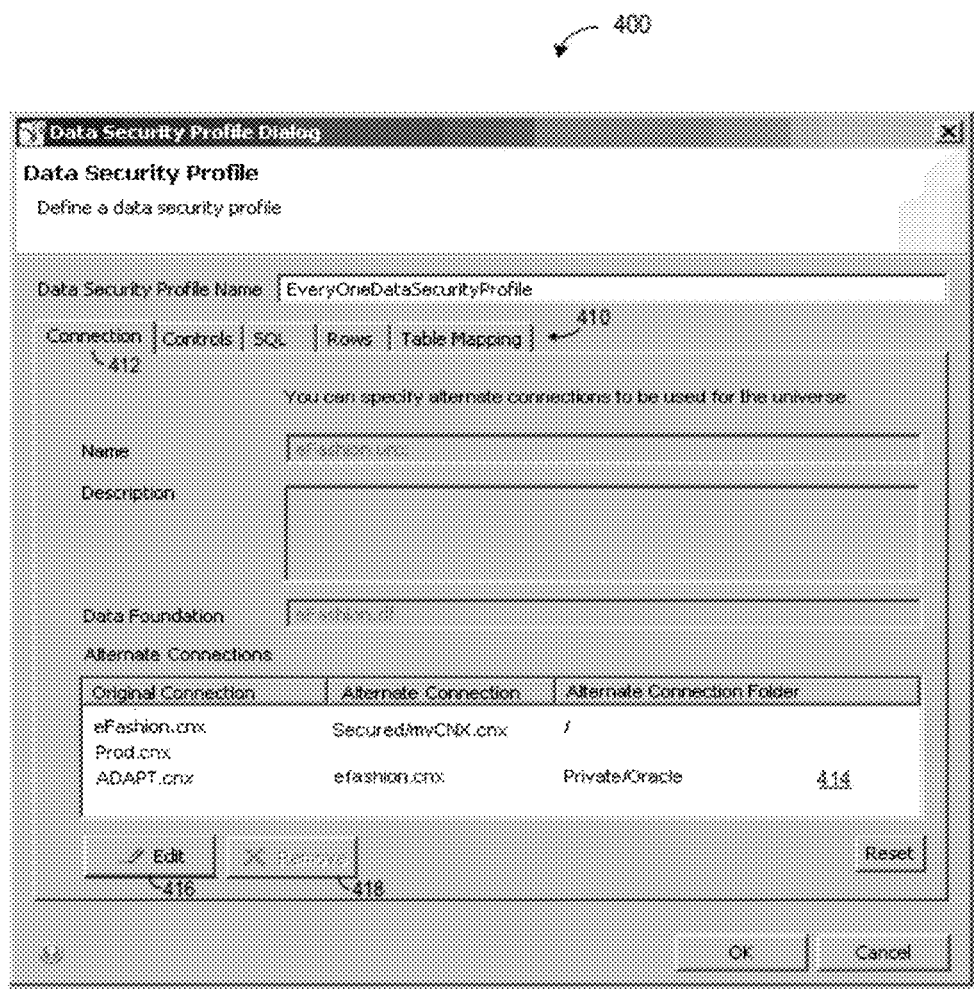
FIG. 4 is a representation of an interface to define a data security profile according to some embodiments.

If one connection is overloaded by several alternate connections specified by several data security profiles, then the connection of the data security profile with highest priority is used. The concept of priority is described below. If the universe is a multi-source universe (i.e., as shown in FIG. 4), each connection overload is independently computed one after the other.

For a given universe, a user may sort data security profiles by priority. This priority may be used to determine a data security profile to apply in a case that several data security profiles are to be applied to the same user. For example, in the case of connection overload and table mapping (i.e., in which only one data security profile can be applied), the data security profile associated with the highest priority is applied. For the Controls tab, the user may choose to assign priorities in order to aggregate different data security profiles.

Figure 5:
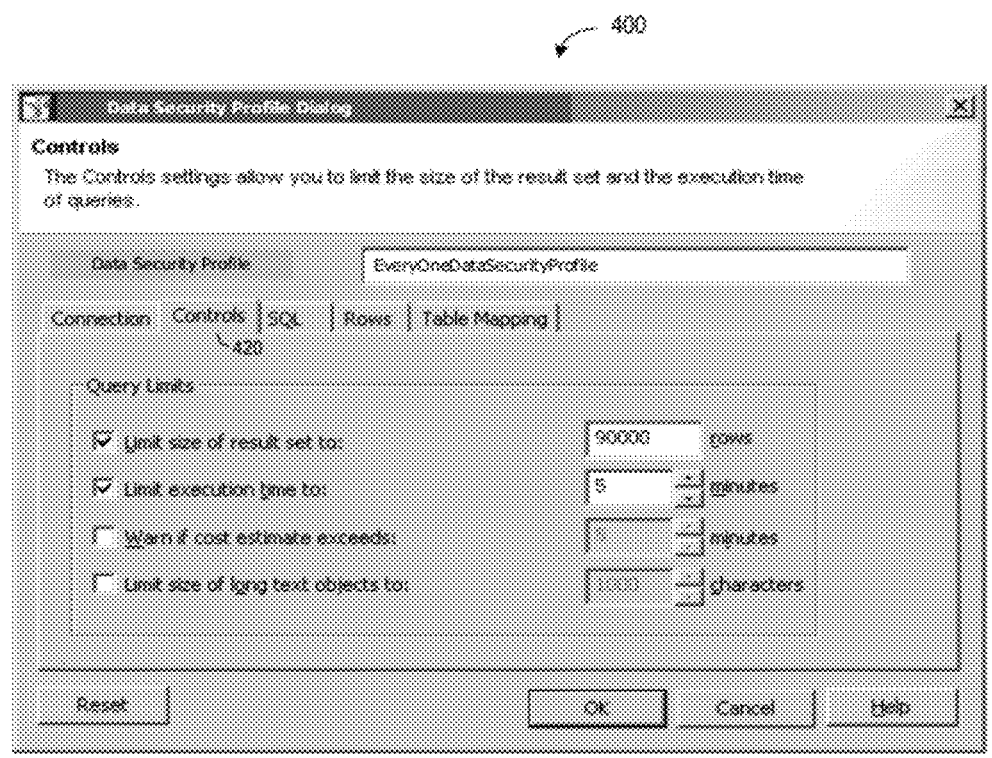
FIG. 5 is a representation of an interface to define a data security profile according to some embodiments.

FIG. 5 illustrates Controls tab 420 of dialog 400 according to some embodiments. For relational universes, parameters specified in Controls tab 420 are used to override some parameters defined at the data foundation level. For a specific user, these parameters can be inherited through different data security profiles. In a case that multiple values of a single parameter are thereby associated with a single user, the effective values of the parameters are determined by the "Control and SQL" option shown in panel 230 of interface 200.

Possible aggregation options include "Very restrictive", in which the value of the parameter is always aggregated with the MIN operator, for inheritance or membership of different groups, "Moderately restrictive", in which the value of the parameter is aggregated with the MIN operator for inheritance and MAX operator for membership of different groups, "Less restrictive", in which the value of the parameter is always aggregated with the MAX operator, for inheritance or membership of different groups, and "Priority", in which the value of the parameter in the data security profile with the higher priority is used.

Figure 6:
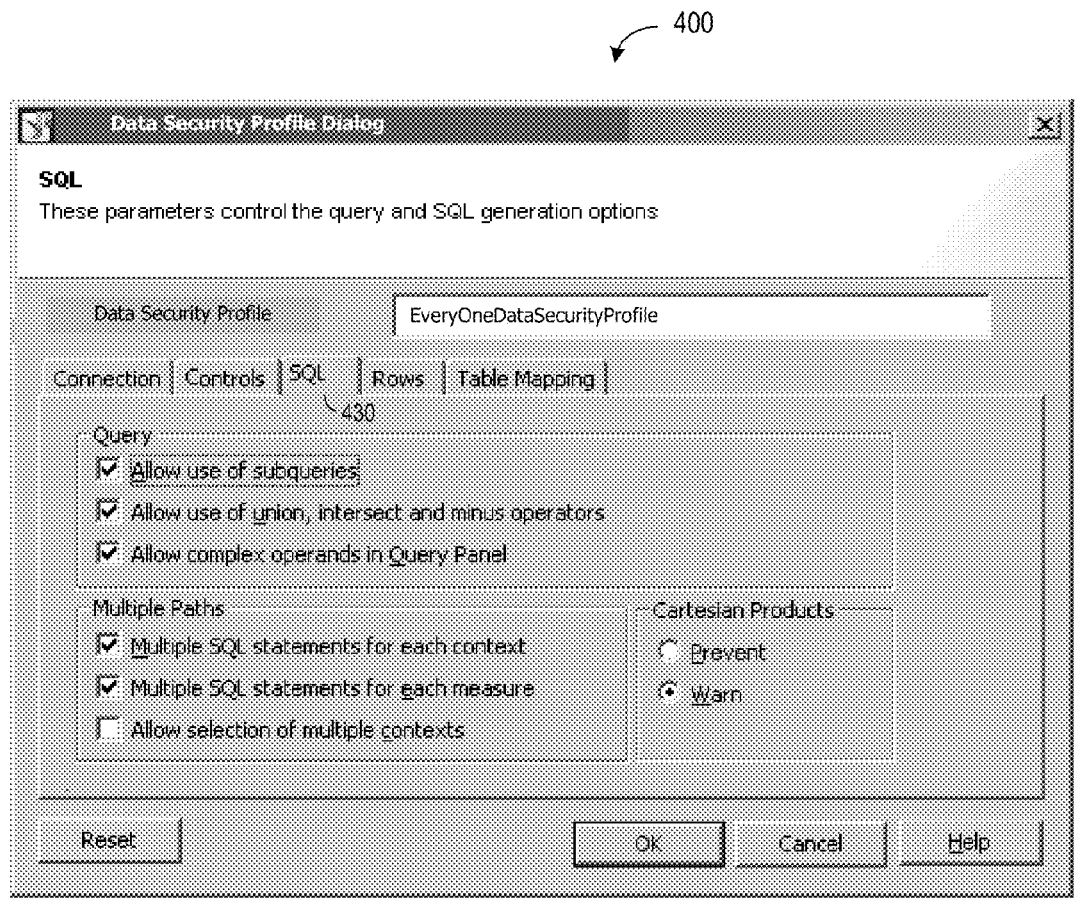
FIG. 6 is a representation of an interface to define a data security profile according to some embodiments.

SQL tab 430, shown in FIG. 6, also allows the specification of parameters to override corresponding parameters defined at the data foundation level. These parameters specify operations that are allowed when generating an SQL query to the hierarchical data structure associated with the universe. Some embodiments do not provide SQL tab 430 for OLAP universes.

Figure 7:
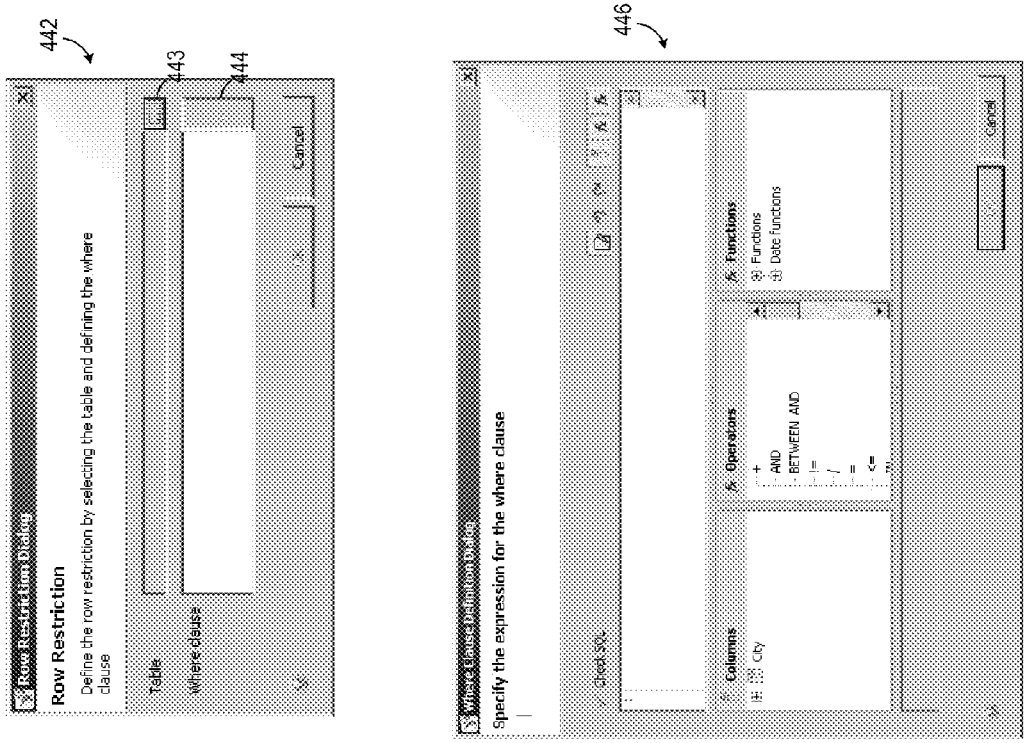
FIG. 7 are representations of interfaces to define a data security profile according to some embodiments.
Figure 7:
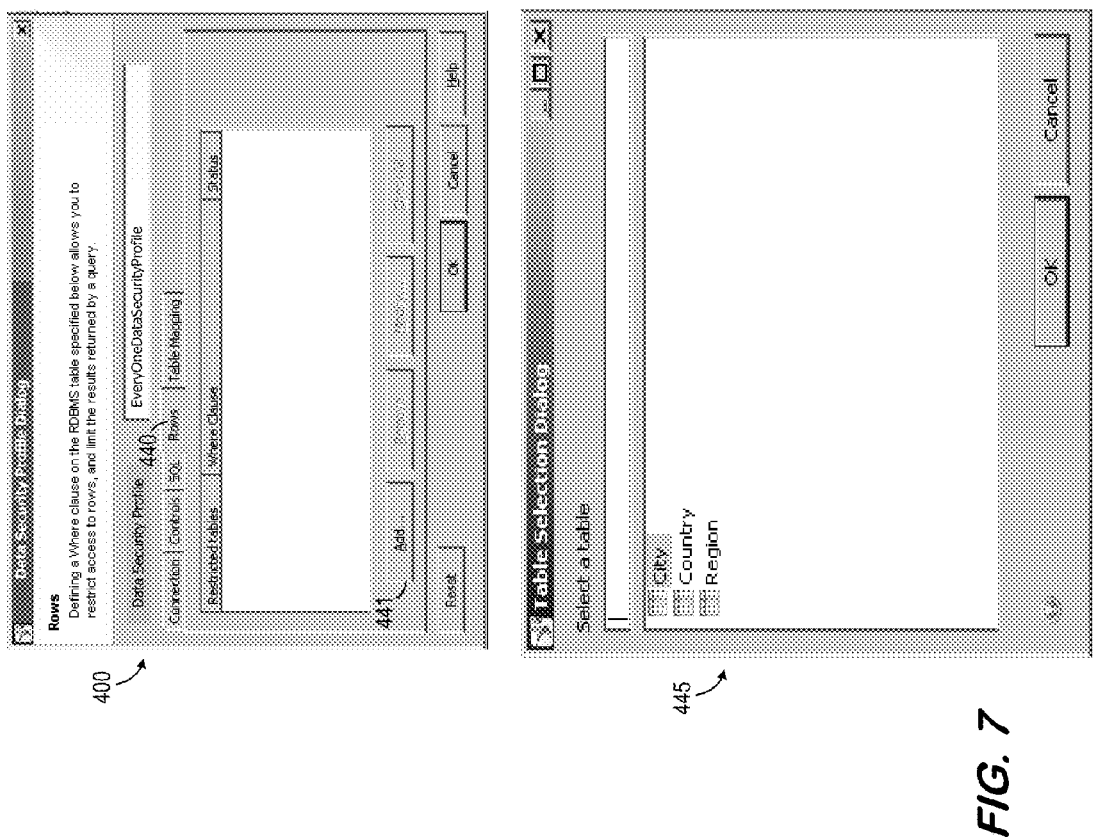

FIG. 7 illustrates Rows tab 440 of dialog 400. Rows tab 440 is used to associate a WHERE clause to a table. The WHERE clause is added to SQL of a query if the table is used in the query. A WHERE clause may be added to prevent a user from seeing unauthorized data, or to filter data so as to reduce the size of result sets. For example, the WHERE clause [WHERE Customers.Country="France"] may be associated to the Customers table. A query accessing the Customers table and including this clause filters and returns only lines that fulfill the WHERE condition.

In one example of this operation, a user may select Add button 441 to display dialog 442. Button 443 is used to invoke dialog 445 for selecting a table from the data foundation and, after a table is selected, button 444 may be used to invoke dialog 446 for creating a WHERE clause associated with a row of the table. The user may also directly type the SQL WHERE clause in the WHERE clause text field of dialog 442.

In a multi-source universe, the SQL of the WHERE clause may reference tables of any databases associated with the multi-source universe.

Panel 230 of interface 200 provides aggregation options for row restrictions called for by several data security profiles. The options may include: "Very restrictive (AND)", in which all specified WHERE clauses are merged in the generated SQL with the AND operator; "Moderately restrictive (ANDOR)", in which WHERE clauses are merged with the AND operator for inheritance and OR operator for membership of different groups; and "Less restrictive (OR)", in which all specified WHERE clauses are merged in the generated SQL with OR operator.

Figure 8:
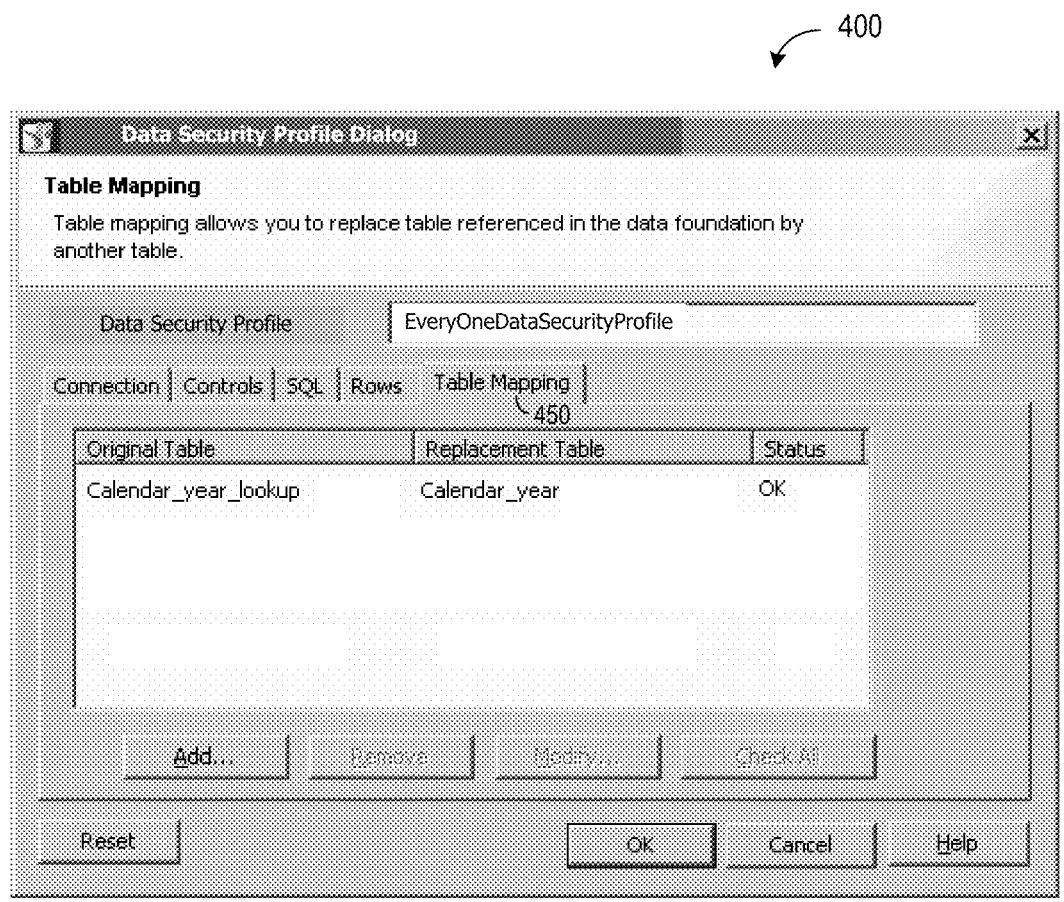
FIG. 8 is a representation of an interface to define a data security profile according to some embodiments.

Table Mapping tab 450, as shown in FIG. 8, allows a user to define a replacement table corresponding to an "original" table. When a query is to be run against the database, any occurrence of a listed original table is replaced by its corresponding replacement table in the generated SQL. In a multi-source universe, the replacement table can be a table from any database used by the multi-source universe. The replacement table may be dynamic. For example, the replacement table may be the result of a substitution through a @VARIABLE function or the result of a prompt that the user must answer at query time (@PROMPT function). The effective table used to replace the original table is computed at query time.

If one original table is overloaded by several data security profiles, the effective replacement table is the one specified by the data security profile with the highest priority. Each overload of an original table is computed independently during generation of the SQL.

Figure 9:
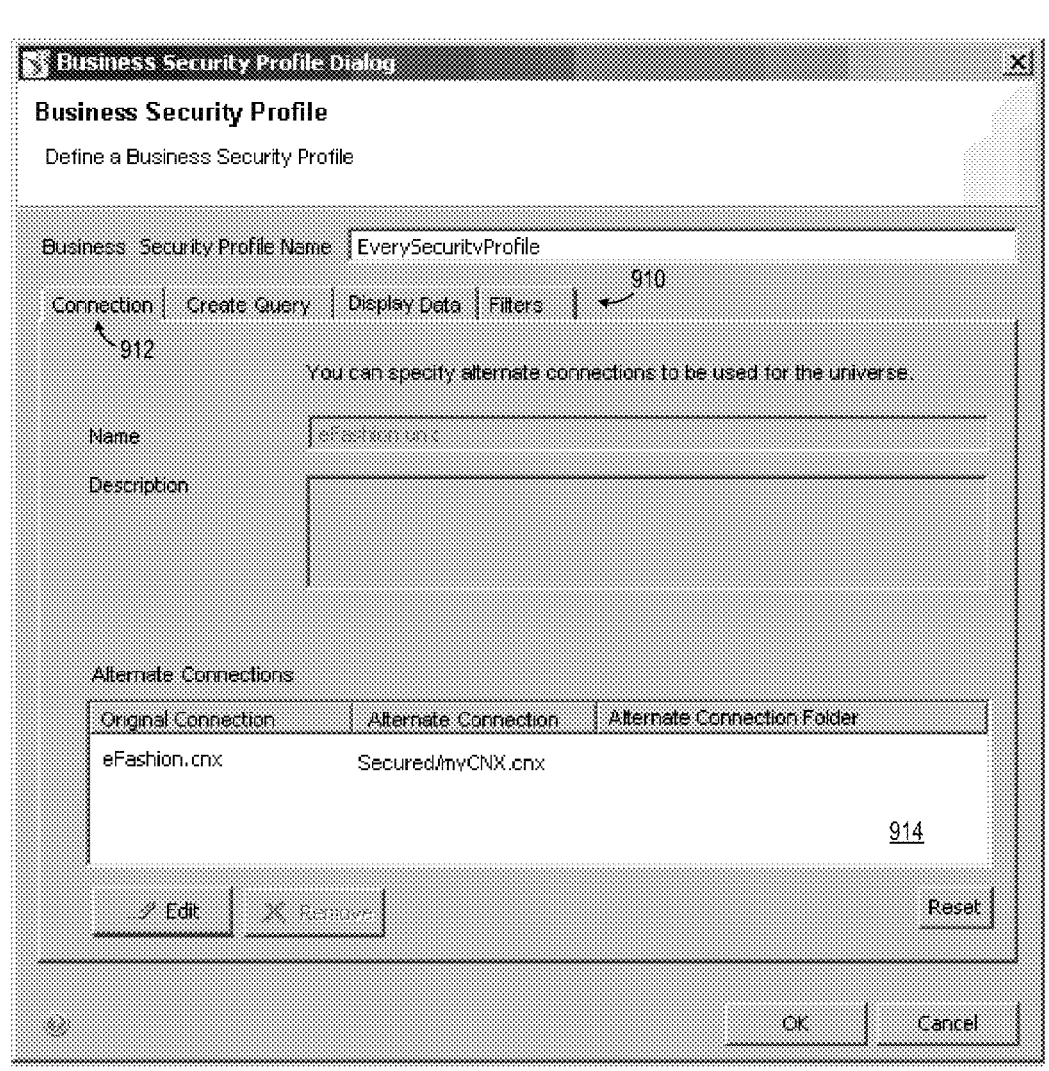
FIG. 9 is a representation of an interface to define a business security profile according to some embodiments.

FIGS. 9 through 19 will be used to describe a business security profile according to some embodiments. In some embodiments, a user selects a toolbar button or context menu option of interfaces 200 or 300 in order to create a business security profile and attach it to a universe or edit an existing business security profile. FIG. 9 illustrates dialog 900 which may be displayed in response to such a selection.

Tabs 910 of dialog 900 may differ depending upon the universe to which the subject data security profile is (or will be) attached. For example, tabs 910 may include Create Query, Display Data and Filters tabs if the universe is relational, and Connection, Create Query, Display Data and Filters tabs for OLAP universes. Accordingly, the Create Query, Display Data and Filters tabs are common to both relational and OLAP universes.

Dialog 900 includes tabs 910, with Connection tab 912 being shown in FIG. 9. Similarly to Connection tab 412 of data security profile dialog 400, Connection tab 912 is used to define alternate secured connections for a user. However, Connection tab 912 is displayed only in the case of OLAP universes, which support only a single original connection. Only OLAP connections can be selected as alternate connection in Alternate Connections window 914.

Figure 10:
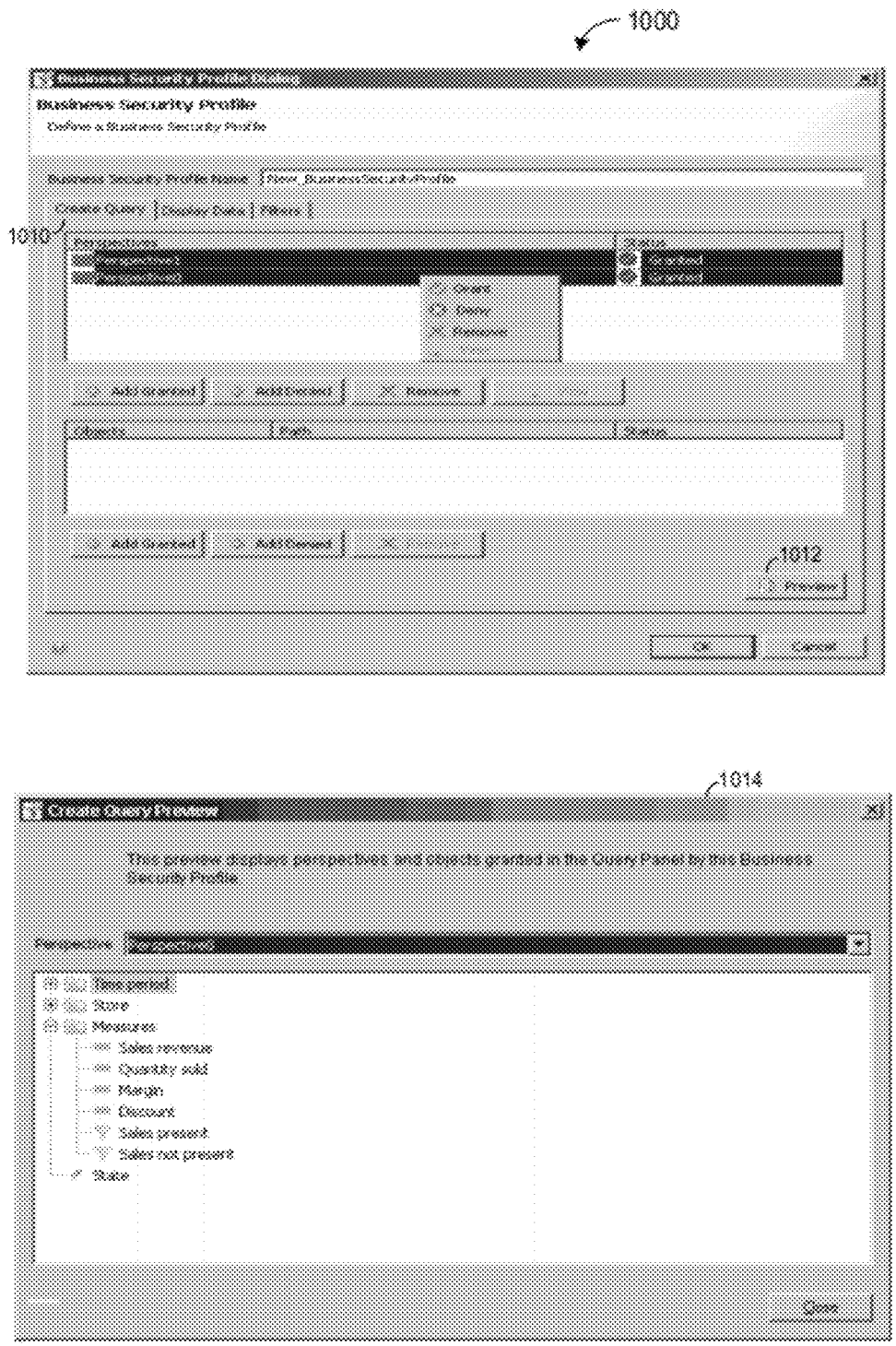
FIG. 10 are representations of interfaces to define a business security profile according to some embodiments.

Turning to FIG. 10, dialog 1000 may be used to create or edit a business security profile for a relational universe. Create Query tab 1010 specifies the objects of the information space metadata which the user is permitted to include in a query of the underlying hierarchical data structure. Such a query may be created using a query panel invoked from interface 200 as described above or using another reporting tool.

Objects may be specified in Create Query tab 1010 via perspectives (i.e., pre-configured groups of objects) or individually. A perspective (or an individual object) can be explicitly granted or explicitly denied, but cannot be both granted and denied. For example, a denied perspective is not displayed in a perspective list of a query panel and a user is not allowed to select this perspective to display objects in the query panel. By default, the user is not allowed to select the objects of this perspective, unless the objects have been explicitly granted. Similarly, a denied object is not displayed in an object list of a query panel and a user is not allowed to create a query based on the denied object. Objects which may be secured from query creation using Create Query tab 1010 include, but are not limited to, Dimensions, Attributes, Measures, Calculated Measures, Calculated Members, Filters, Prompts, Member Sets, Predefined Conditions, and Prompts. It is also possible to secure container object, such as Folders (aka Classes), Hierarchies, and Measures Groups. These containers may contain single objects or other containers.

Preview button 1012 may be selected to display dialog 1014. Dialog 1014 displays the perspectives and objects to be granted in a query panel as a result of the contents of Create Query tab 1010. Aggregation rules may be required to determine the effective status of a perspective or an object explicitly granted or denied in Create Query tab 1010. For example, the perspectives effectively granted by a given business security profile may consist of the perspectives explicitly granted by the business security profile minus the list of perspectives explicitly denied by the business security profile. Moreover, if a granted perspective is expanded in a query panel or other interface for generating an object-based query, the displayed (i.e., granted) objects may include the objects contained in the perspective plus the objects explicitly granted by the business security profile and their children minus the objects explicitly denied by the business security profile and their children.

The foregoing rules reflect the following: 1) if a container is set as granted or denied, then its status is inherited by all objects and sub-containers that belong to the container; 2) a child cannot be granted if one of his parents is denied; and 3) if a container is set as denied, all objects and sub-containers below are denied, regardless of their status.

In another example, Perspective1 contains Object1, Object2 and Object3, and Perspective2 contains Object1, Object4 and Object5. A user is granted Perspective1 and Perspective2. In the query panel, if he selects Perspective1, he sees Object1, Object2 and Object3 (i.e., only the objects of Perspective1. He does not see Object4 or Object5). If he selects Perspective2, he sees Object1, Object4 and Object5 (i.e., only the objects of Perspective2. He does not see Object2 or Object3).

In a second case, a user is granted Perspective1 and Perspective2, Object2 and Object4. In the Query Panel, if he selects Perspective1, he sees Object1, Object2, Object3 and Object4 (i.e., the objects of Perspective1+Object4). If he selects Perspective2, he sees Object1, Object4, Object5 and Object2 (i.e., the objects of Perspective1+Object2).

All perspectives may be denied and some objects granted. In this case, a query panel may contain only the granted objects, without any perspectives. Embodiments may allow granting of "All perspectives" or "All objects". Usage of "All perspectives" (or "All objects") avoids explicitly granting all perspectives (or objects) and may reduce a need for redefining a security profile if the list of perspectives (or objects) changes (e.g., by adding or removing a perspective from the information space metadata).

Business security profile aggregation rules specified in panel 230 of interface 200 may be used to determine the perspectives and objects a user can effectively use to create a query. Usage of such aggregation rules according to some embodiments will be provided below.

Figure 11:
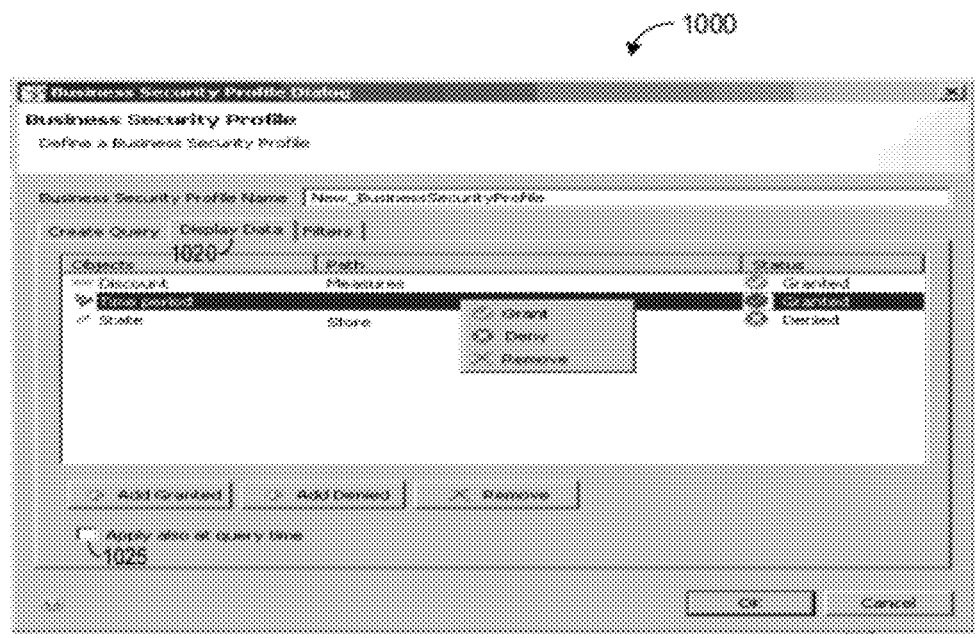
FIG. 11 is a representation of an interface to define a business security profile according to some embodiments.

Display Data tab 1020, shown in FIG. 11, may be used to restrict viewing of data retrieved from a database by specifying the object used to retrieve the data. Restricting viewing of the data does not affect the ability of the user to create a query using the associated object, which is independently controlled via Create Query tab 1010.

As described with respect to FIG. 10, an object can be explicitly granted or explicitly denied, but the same object cannot be both granted and denied. Objects affected by Display Data tab 1020 may include Dimensions, Calculated Measures, Calculated Members, Attributes, Measures, Named Sets and Levels, as well as Containers that may contain single objects or other containers (e.g., Folders (aka Classes), Hierarchies, Measures Groups). It is possible to explicitly grant or deny "All objects" and to explicitly deny or grant individual objects to create exceptions to the "All objects" parameter as described above.

Aggregation rules may be required to determine the effective status of an object that is explicitly granted or denied in Display Data tab 1020. For example, the objects that can be used to retrieve data and are effectively granted by a business security profile may include the objects explicitly granted by the business security profile and their children minus the objects explicitly denied by the business security profile and their children. More particularly, all objects and sub-containers that belong to a container may be considered to inherit the status of the container.

Business security profile aggregation rules specified in panel 230 of interface 200 may be used to determine the objects whose data may be viewed by a user. Again, usage of such aggregation rules according to some embodiments will be provided below.

FIGS. 12 through 14 illustrate the consequences of access restrictions specified in Display Data tab 1020 according to some embodiments. For example, FIG. 12 shows a report populated with data from a database and as displayed to a first user. The database is associated with a universe including the objects Year, Country, City, Product, Revenue and Number. The data was retrieved from a relational database using the SQL query:

---

SELECT Calendar_year_lookup.Yr, Outlet_Lookup.State,
Outlet_Lookup.City,
   sum(Shop_facts.Amount_sold), sum(Shop_facts.Quantity_sold)
FROM
   Calendar_year_lookup, Outlet_Lookup, Shop_facts
WHERE
   ( Outlet_Lookup.Shop_id=Shop_facts.Shop_id )
   AND ( Shop_facts.Week_id=Calendar_year_lookup.Week_id )
GROUP BY
   Calendar_year_lookup.Yr, Outlet_Lookup.State,
   Outlet_Lookup.City
      On an OLAP database, the following MDX query would be used:
SELECT
   NON EMPTY {[Measures].[Revenue Number]} ON
   COLUMNS,
   NON EMPTY Hierarchize
    (Crossjoin
      (Crossjoin ([Date].[Year].[Year].Members,
         [Customer].[Country].[Country].Members),
         [Customer].[City].[City].Members) )
   DIMENSION PROPERTIES PARENT_UNIQUE_NAME ON
   ROWS FROM( [SALES_CUBE] )

---

According to the present example, a business security profile associated with the universe and the first user does not deny "view" access to any of the above-listed objects.

FIG. 13 shows the FIG. 12 report as presented to a second user. It will be assumed that an administrator has created a second business security profile which explicitly denies "view" access to the Number measure object (e.g., via Display Data tab 1020), and that this second business security profile is associated with the universe and the second user. As a result, the data retrieved using the Number measure object is not presented to the second user. Any system for redacting or otherwise preventing display of the restricted data may be employed, including but not limited to reformatting the report to remove any associated columns.

FIG. 14 shows the FIG. 12 report as presented to a third user. It will be assumed that display of the FIG. 14 report is governed by a third business security profile which explicitly denies "view" access to the City dimension object (e.g., via Display Data tab 1020), and that the third business security profile is associated with the universe and the third user. Accordingly, the data retrieved using the City dimension object is not presented to the third user, in this case by removing the associated columns.

Display Data tab 1020 includes checkbox 1025 to indicate that the object-based restrictions shown therein should also be applied at query time. If checkbox 1025 is checked, any query issued by the user is modified so as to ensure that the retrieved data does not include data that the user is not permitted to view. In the case of the second business security profile mentioned with respect to FIG. 13, any query issued by the second user would be modified to prevent retrieval of any data associated with the Number object. For example, if the second user chose to refresh the displayed report, the original query set forth above would be modified to the following:

---

SELECT Calendar_year_lookup.Yr, Outlet_Lookup.State,
Outlet_Lookup.City,
   sum(Shop_facts.Amount_sold)
FROM
   Calendar_year_lookup, Outlet_Lookup, Shop_facts
WHERE
   ( Outlet_Lookup.Shop_id=Shop_facts.Shop_id )
   AND ( Shop_facts.Week_id=Calendar_year_lookup.Week_id )
GROUP BY
   Calendar_year_lookup.Yr, Outlet_Lookup.State,
   Outlet_Lookup.City

---

Figure 15:
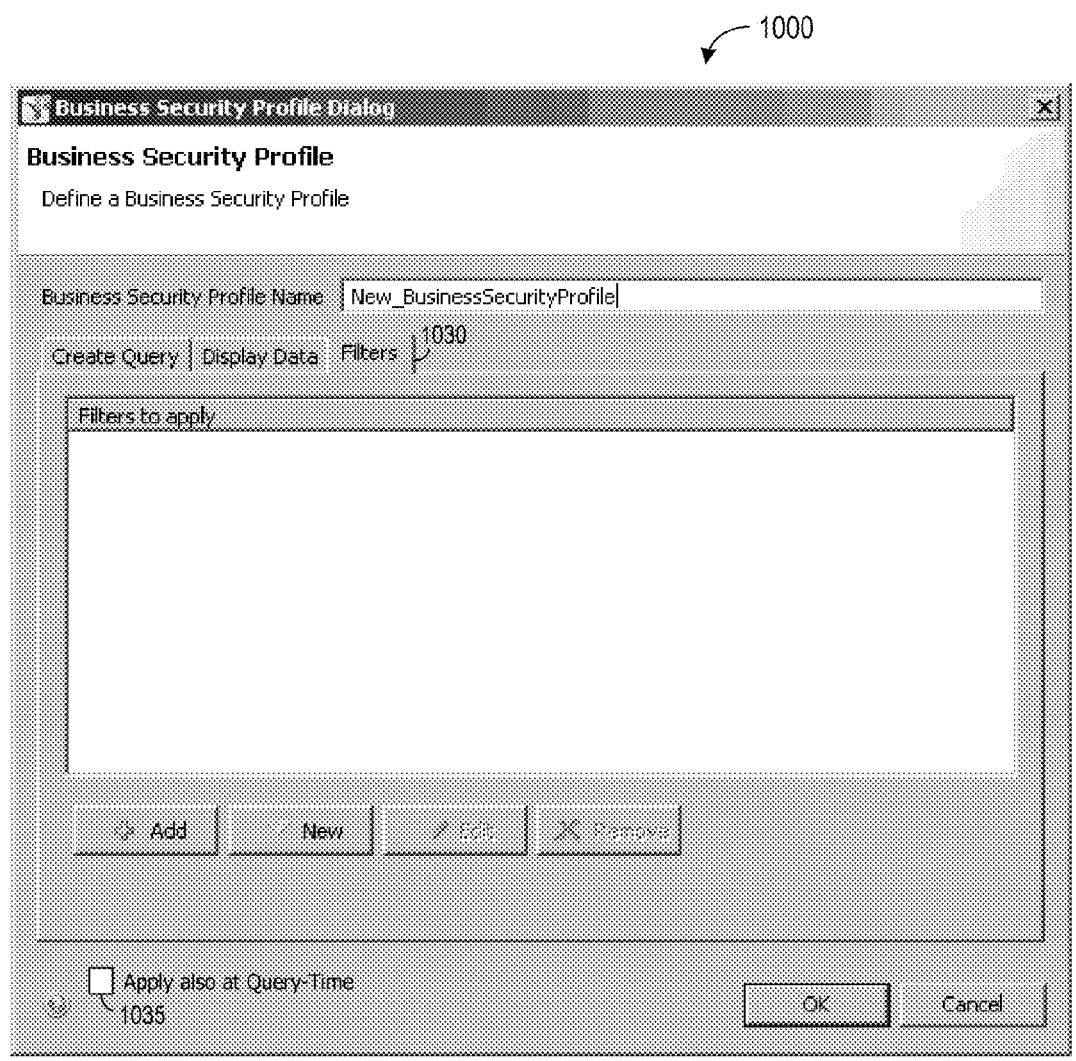
FIG. 15 is a representation of an interface to define a business security profile according to some embodiments.

FIG. 15 illustrates Filters tab 1030 of dialog 1000 for specifying object-based filters for a relational universe. The filters determine the data which an associated user is allowed to view. According to some embodiments, specified filters may apply to both measures and dimensions, and may aggregate with AND and OR operators. Advantageously, the filters Business Security Profile may rely on objects with a high-level semantic created on the business layer, thereby freeing the user from having to generate filters by writing SQL or MDX statements.

FIG. 16 illustrates the FIG. 12 report after application of the filter "Revenue>250" according to some embodiments. Accordingly, a user associated with such a filter through a business security profile is prevented from viewing any data retrieved by the Revenue object and having a value less than 250. Similarly, FIG. 17 shows the FIG. 12 report as filtered to include only data conforming to the filter "City=Paris". In this regard, all Revenue and Number columns of FIG. 17 reflect only Revenue and Number data associated with "City=Paris".

Filters tab 1030 includes checkbox 1035 to indicate that the object-based filters shown therein should also be applied at query time. If checked, any query issued by the user is modified so as to ensure that the retrieved data complies with the specified filter(s). For example, to comply with the filter "City=Paris" at query-time, the query used to generate the FIG. 12 report may be modified to the following:

```
SELECT Calendar_year_lookup.Yr, Outlet_Lookup.State,
Outlet_Lookup.City,
    sum(Shop_facts.Amount_sold), sum(Shop_facts.Quantity_sold)
FROM
    Calendar_year_lookup, Outlet_Lookup, Shop_facts
WHERE
    ( Outlet_Lookup.Shop_id=Shop_facts.Shop_id )
    AND ( Shop_facts.Week_id=Calendar_year_lookup.Week_id )
    AND ( Outlet_Lookup.City = "Paris" )
GROUP BY
    Calendar_year_lookup.Yr, Outlet_Lookup.State,
    Outlet_Lookup.City
```

Figure 18:
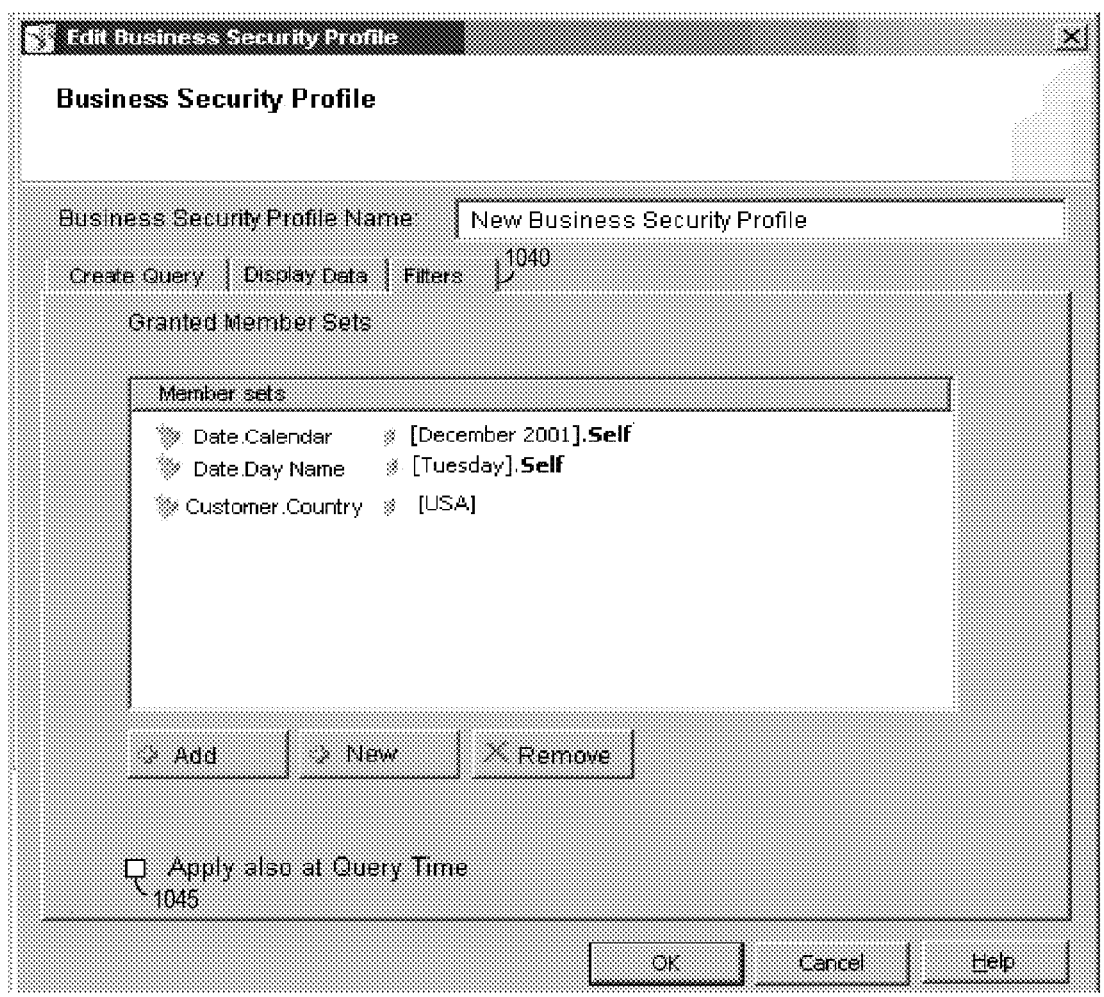
FIG. 18 is a representation of an interface to define a business security profile according to some embodiments.

FIG. 18 illustrates dialog 1000 in a case that the subject universe is based on an OLAP data structure. FIG. 18 shows Filters tab 1040, which is used to grant or deny members on a dimension. Data corresponding to a member that is denied through Filters tab 1040 are not displayed to the user. Moreover, such data cannot be accessed if apply at query time checkbox 1045 is checked.

Filters tab 1040 may allow usage of static and dynamic Member Sets. A static Member Set contains a list of members that do not evolve in time. This list of members is known and will be used when applying the access restrictions specified in Filters tab 1040. The members of a dynamic Member Set may evolve in time and therefore access to the underlying database is needed to refresh the list of members and apply the appropriate access restrictions A definition of a dynamic Member Set may be based on an MDX expression that may contain @VARIABLE or @PROMPT. If Member Set access restrictions are to be applied at query time, values of @VARIABLE variables are recomputed and substituted. @PROMPT variables will be prompted to the user and replaced in the report by the user's answer. If filters on Member Set are to be applied at view time, values of @VARIABLE variables are recomputed for the user. @PROMPT variables will not be prompted to the user and their values will be the same as the values saved in the report.

FIG. 19 shows the FIG. 12 report as filtered to include only data from the granted Member Set "City=Paris".

Filters tab 1030 includes checkbox 1035 to indicate that the object-based filters shown therein should also be applied at query time. If checked, any query issued by the user is modified so as to ensure that the retrieved data complies with the specified filter(s). For example, to comply with the specified Member Set "City=Paris" at query-time, the query used to generate the FIG. 12 report may be modified to:

```
SELECT
    NON EMPTY {[Measures].[Revenue Number]} ON COLUMNS,
    NON EMPTY Hierarchize
    (Crossjoin
        (Crossjoin ([Date].[Year].[Year].Members,
            [Customer].[Country].[Country].Members),
            [Customer].[City].[City].Members) )
DIMENSION PROPERTIES PARENT_UNIQUE_NAME ON ROWS
FROM( SELECT {[Customer].[City].&[Paris]&[75]} ON COLUMNS
        FROM [SALES_CUBE] )
```

Panel 230 of interface 200 provides aggregation options for Create Query/Display Data and Filters called for by several business security profiles. The options may include: "Very restrictive (AND)", in which specified objects are merged with the AND operator; "Moderately restrictive (ANDOR)", in which specified objects are merged with the AND operator for inheritance and OR operator for membership of different groups; and "Less restrictive (OR)", in which specified objects are merged with OR operator.

Figure 20:
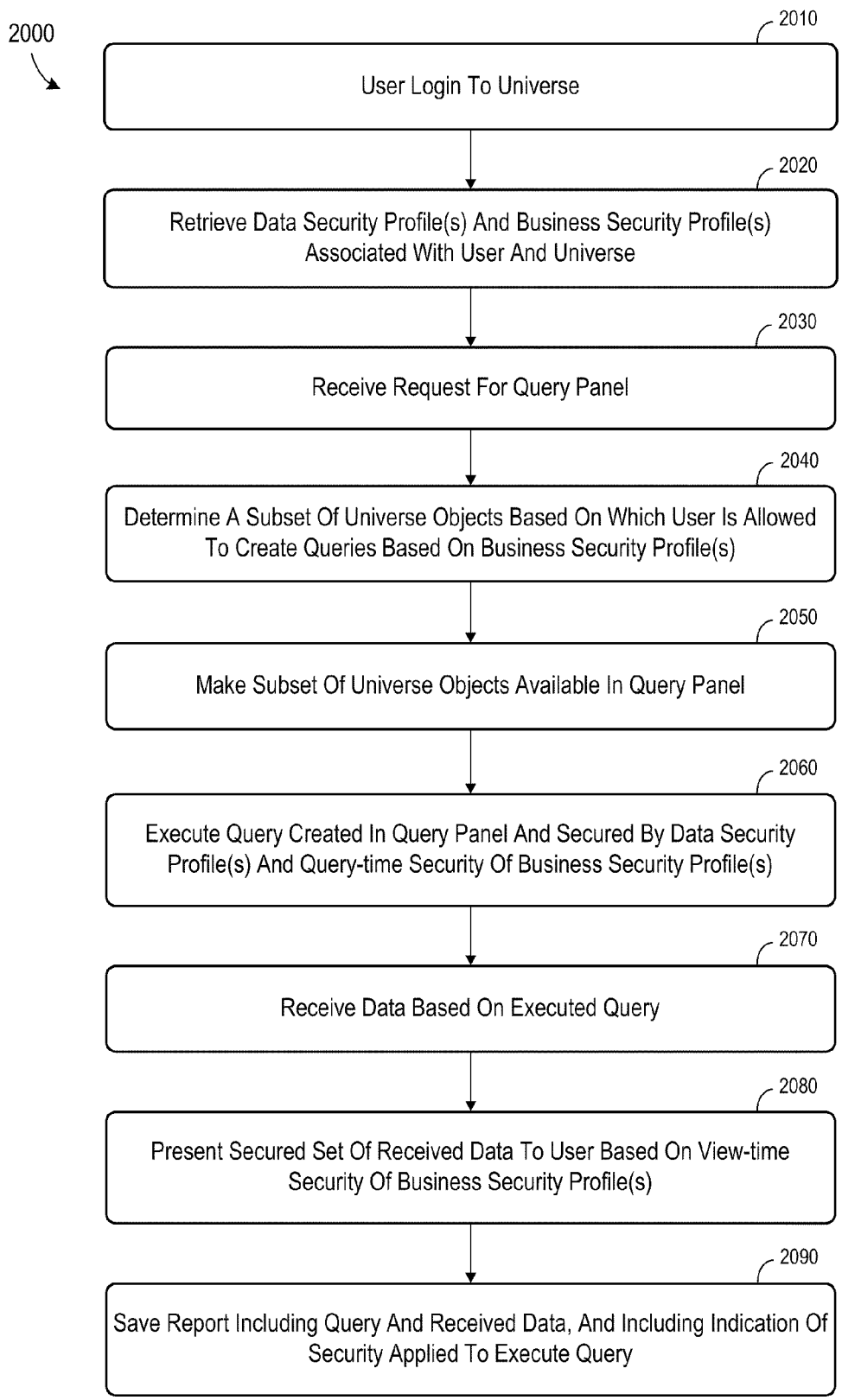
FIG. 20 is a flow diagram of a process according to some embodiments.

FIG. 20 is a flow diagram of process 2000 according to some embodiments. Process 2000 may be implemented by an information engine providing object-based reporting functionality to client applications. In this regard, process 2000 may be embodied in computer-executable program code stored on a tangible computer-readable medium. Process 2000 may be implemented by any combination of hardware and/or software.

Figure 21:
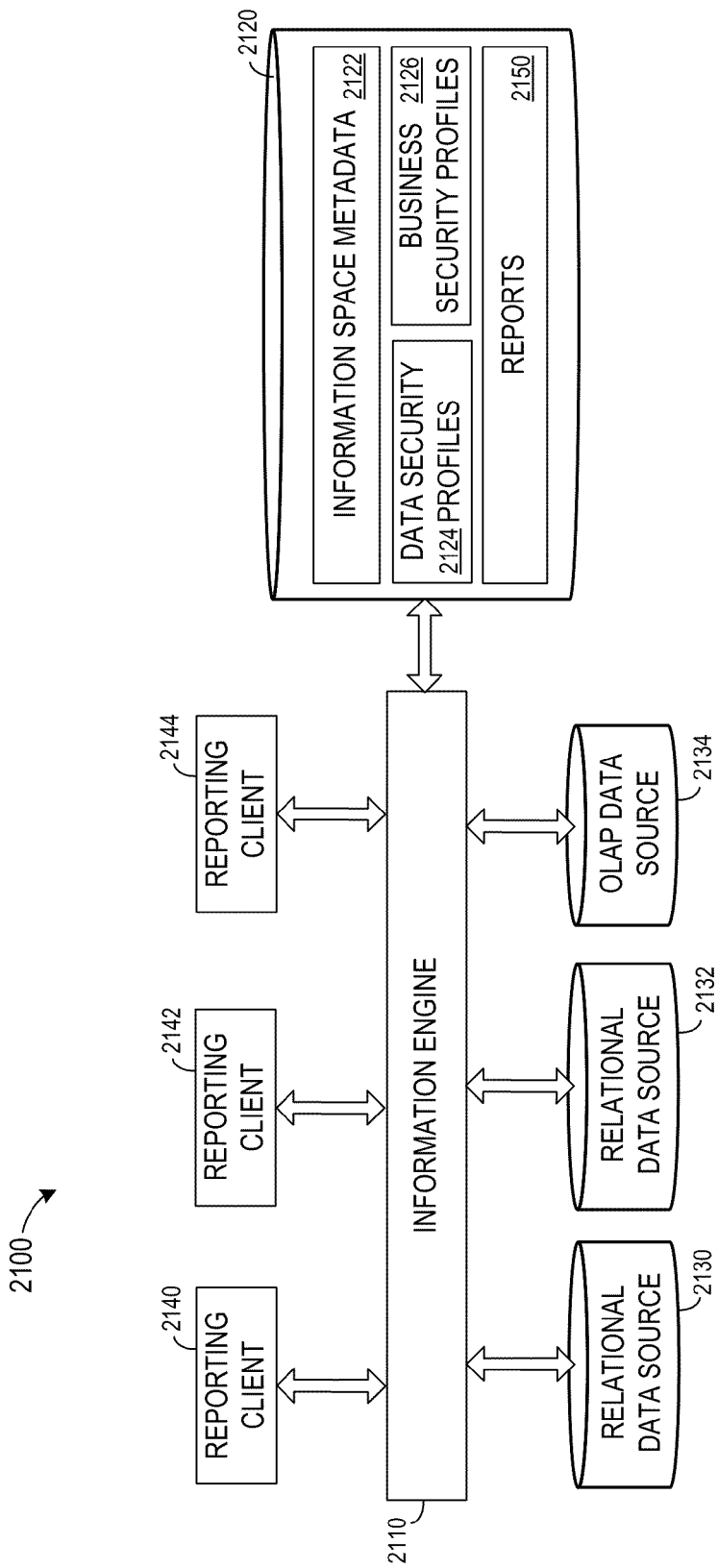
FIG. 21 is a block diagram of a run-time system according to some embodiments.

FIG. 21 illustrates runtime architecture 2100 according to some embodiments. Information engine 2110 may execute process 2000 as described herein, but embodiments are not limited thereto. Generally, reporting clients 2140 through 2144 comprise software applications for object-based viewing of stored business data and/or creating object-based reports including stored business data. Examples of reporting clients 2140 through 2144 include BusinessObjects Web Intelligence, Crystal Reports, and BusinessObjects Explorer. Any number of reporting clients of one or more types may be supported according to some embodiments.

CMS 2120 includes information space metadata 2122 corresponding to each of relational data sources 2130/2132 and OLAP data source 2134. Embodiments are not limited to the number and types of data sources shown in FIG. 21. Information space metadata 2122 indicates universe objects mapped to logical entities of relational data sources 2130/2132 and OLAP data source 2134. Metadata 2122 may include objects of more than one universe, and a universe may be based on more than one data source (i.e., a multi-source universe).

Information engine 2110 may execute process 2000 to allow a user to generate a query and to view results of the query. Initially, at 2010, a user login operation is performed. The login operation may include receiving authorization credentials of a user and a universe name from a reporting client, and communicating with CMS 2120 to validate the authorization credentials against the universe.

Assuming the login is successful and the user is permitted to access the named universe, information engine 2110 retrieves one or more data security profiles 2124 and one or more business security profiles 2126 from CMS 2120 at 2020. The retrieved data security profiles 2124 and business security profiles 2126 are those which are associated with (i.e., "attached to") the universe and to the user within CMS 2120. As discussed above, a security profile may be associated with a user explicitly or through inheritance.

A request for a query panel is received at 2030. A query panel may comprise any interface which a user may manipulate to generate an object-based query. For example, reporting client 2140 may display a report creation interface including a toolbar button for invoking a query panel. Upon user selection of the toolbar button, information engine 2110 receives the request at 2030.

Next, at 2040, information engine 2110 determines a set of objects and perspectives of the current universe which the user may use to generate a query. This determination is based on the business security profiles retrieved at 2020. As described above, a business security profile specifies objects which a user may use to generate a query (e.g., via a Create Query tab). In a case that more than one business security profile is retrieved at 2020, aggregation rules are applied to determine the effective object restrictions prior to determining the set of objects which the user may use to generate a query.

Figure 22:
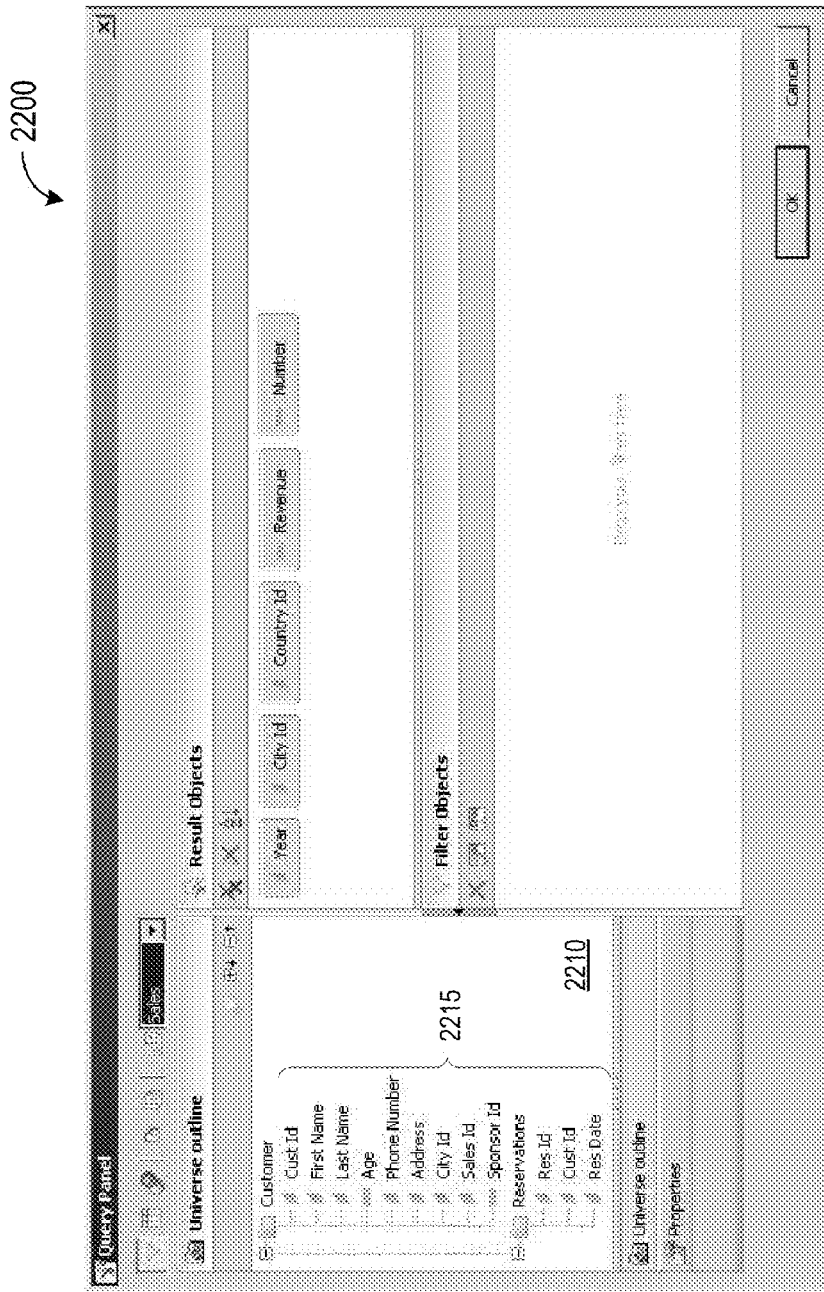
FIG. 22 is a representation of an interface to create a query according to some embodiments.

The determined set of universe objects is made available to the user at 2050. For example, information engine may indicate the set of objects to reporting client 2140 and, in response, reporting client 2140 may present the objects in a query panel. FIG. 22 is an outward view of query panel 2200 according to some embodiments. Query panel 2200 includes universe object window 2210 presenting the set of objects 2215 determined at 2040 according to some embodiments. A user may manipulate query panel 2200 to create a query of the current universe based on objects 2215.

Continuing with process 2000, the created query is executed at 2060. The query is based on one or more of the set of objects determined at 2040. Information engine 2110 transforms the created object-based query to a lower-level query of the underlying hierarchical data structure(s) based on mappings associated with the objects of the query. In addition, the lower-level query may be secured by any or all of the query-time securities described above.

For example, each of the one or more data security profiles retrieved at 2020 may specify Connection, Controls, SQL, Rows and/or Table Mapping restrictions to be applied at query-time. Moreover, each of the one or more business security profiles retrieved at 2020 may specify Display Data and Filters (and Connections for OLAP universes) to be applied at query-time. However, in some embodiments, the retrieved business security profiles do not specify any query-time restrictions.

Each of the query-time restrictions may be accounted for by overloading the lower-level query as described above. As also described above, aggregation rules may be applied to determine effective restrictions in a case that more than one restriction of a given type is associated with the user and the universe.

Information engine 2110 receives data stored in the relevant hierarchical data structure(s) at 2070 in response to execution of the query. View-time security is then applied to the received data based on the retrieved business security profile(s) to determine a set of data which the user is allowed to view, and the secured set of data is presented to the user at 2080. The view-time security may include restrictions such as those specified within the above-described Display Data and Filters tabs.

For a user who needs only to access already-retrieved data, view-time security allows the application of security specific to the user without requiring re-querying of the database. Moreover, by providing an indication of the security applied to the already-retrieved data at query time, embodiments may avoid reapplying the same security when other users request the already-retrieved data.

The data received at 2070 (in response to execution of the query) may include more data than is presented to the user at 2080, is saved along with the query in a report at 2090. The report may be saved among reports 2150 of CMS 2120 for later access by the current user or by other users associated with different security profiles. Also, the report is saved along with an indication of the security restrictions that were applied during the execution of the query which retrieved the data.

According to some embodiments of 2090, the report is saved with an indication of the security restrictions (e.g., Data Security Profile and Business Security Profile) applied at query time and of the functional filters requested by the user through the query. These functional filters were applied to the report data set at query time.

The indication may specify the security restriction values that were applied and the time at which they were applied. @VARIABLE is replaced by the values used during evaluation of the security. Saving the replaced values may be useful because the variables may be assigned different values for different users. For example, @VARIABLE (BOUSER) may be evaluated differently for the user who has created the report than for a user who subsequently opens the report.

According to some embodiments of process 2000, the user who created the query may be presented with less than all of the data received via execution of the query. Moreover, this view-time security is independent of the particular objects which the user was permitted to use within the query. Process 2000 may therefore allow a user to create object-based queries to retrieve data which the user is not permitted to view and to store the retrieved data in an associated report for later access by another user having view-time access to the data.

Figure 23:
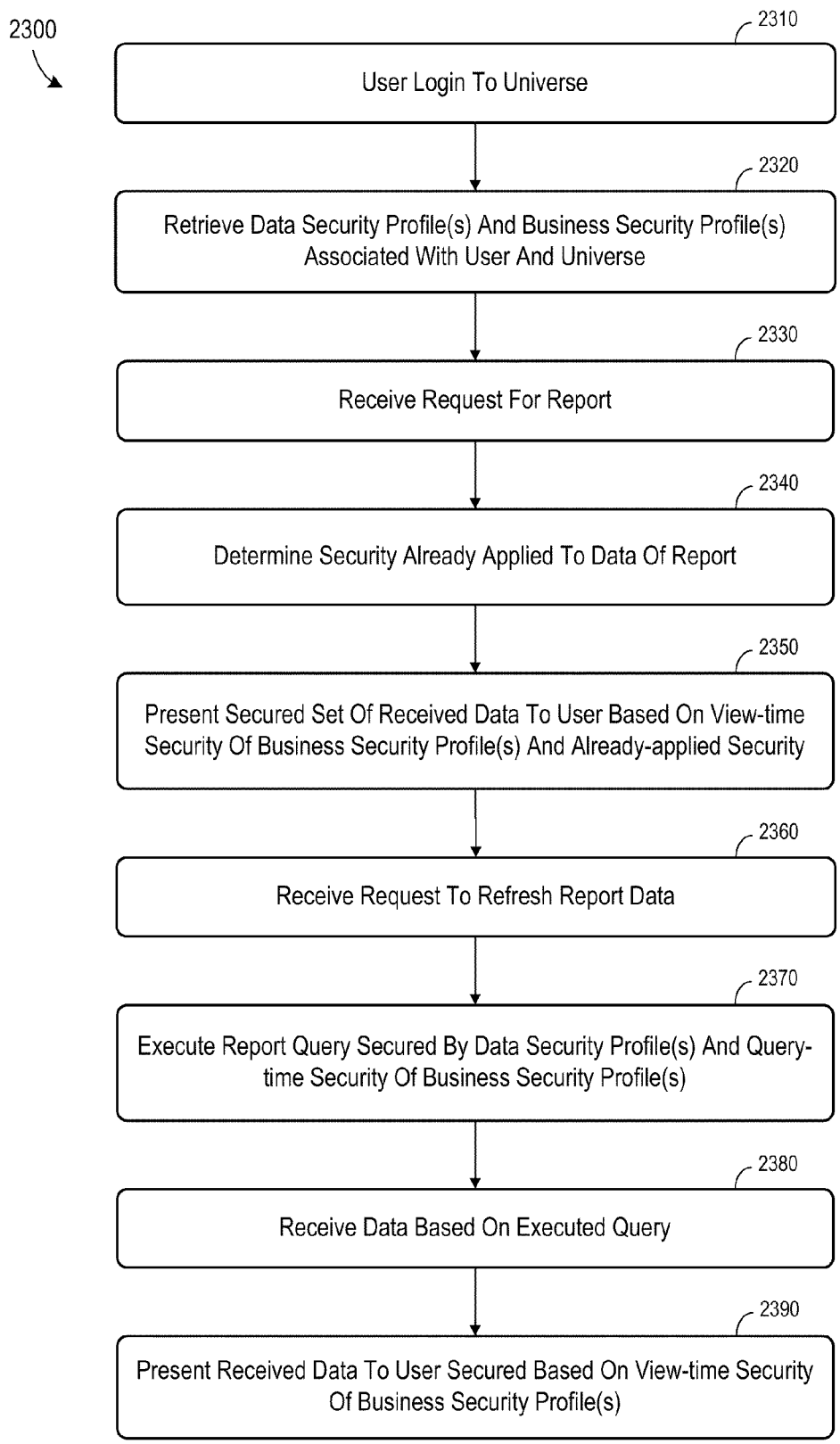
FIG. 23 is a flow diagram of a process according to some embodiments.

Process 2300 of FIG. 23 may be executed to access such stored data according to some embodiments. Process 2300 may also be performed by information engine 2110 according to some embodiments.

A user login operation is performed at 2310 with respect to a particular universe and associated security profiles are retrieved at 2320 as described above with respect to 2110 and 2120. The user may then operate one of reporting clients 2140-2144 to browse reports that are associated with the current universe and stored in CMS 2120. Information engine 2110 receives a request for one such report at 2330.

As described above, the stored report includes data retrieved from one or more data sources underlying the current universe. The data is stored in association with information including the query-time security that was applied to retrieve the data. Accordingly, at 2340, information engine 2110 determines the query-time security that was applied to retrieve the data. The query-time security may comprise filters defined by an applicable business security profile or functional filters (e.g., SQL statements) defined by the report document creator.

Next, at 2350, the data is secured and presented to the user based on the business security profile(s) retrieved at 2320 and on the query-time security that was applied to retrieve the data. The retrieved business security profile(s) may include view-time restrictions such as those described above with respect to the Display Data and Filters tabs. Again, in a case that more than one business security profile is retrieved at 2320, aggregation rules are applied to determine the effective view-time restrictions.

In some embodiments, the effective view-time restrictions are simply applied to the stored data and presented to the user. However, if the already-applied query-time security includes one or more of the effective view-time restrictions, it may be determined to ignore these one or more effective view-time restrictions (i.e., to not apply the restrictions to the data) prior to presenting the secured data.

Such a determination may be based on hierarchical relationships between dimensions. For example, it may be determined that data measured in "Country=France" has already been allowed at query-time. Accordingly, it is determined that a required view-time security filter on "City=Paris" need not be applied prior to presenting the secured data. Of course, such operation requires knowledge that Paris is located in France, which may be available through the hierarchical relationships between dimensions.

Redundant filters on numerical values may also be ignored. For example, if a filter "Revenue>200" has already been applied to deny data at query-time, then there is no need to apply a filter "Revenue>300" to the data prior to presenting the secured data.

Figure 24:
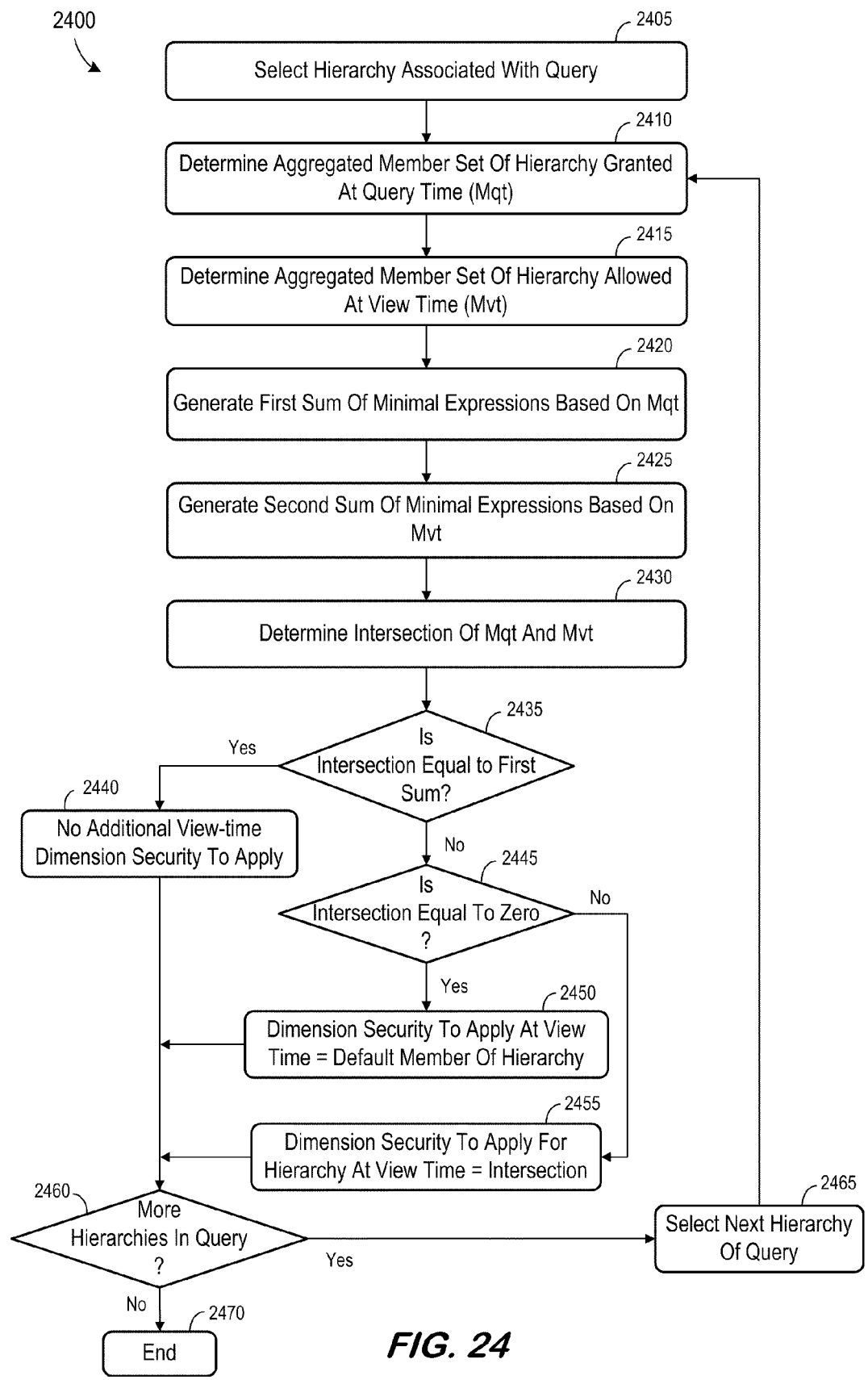
FIG. 24 is a flow diagram of a process according to some embodiments.
Figure 25:
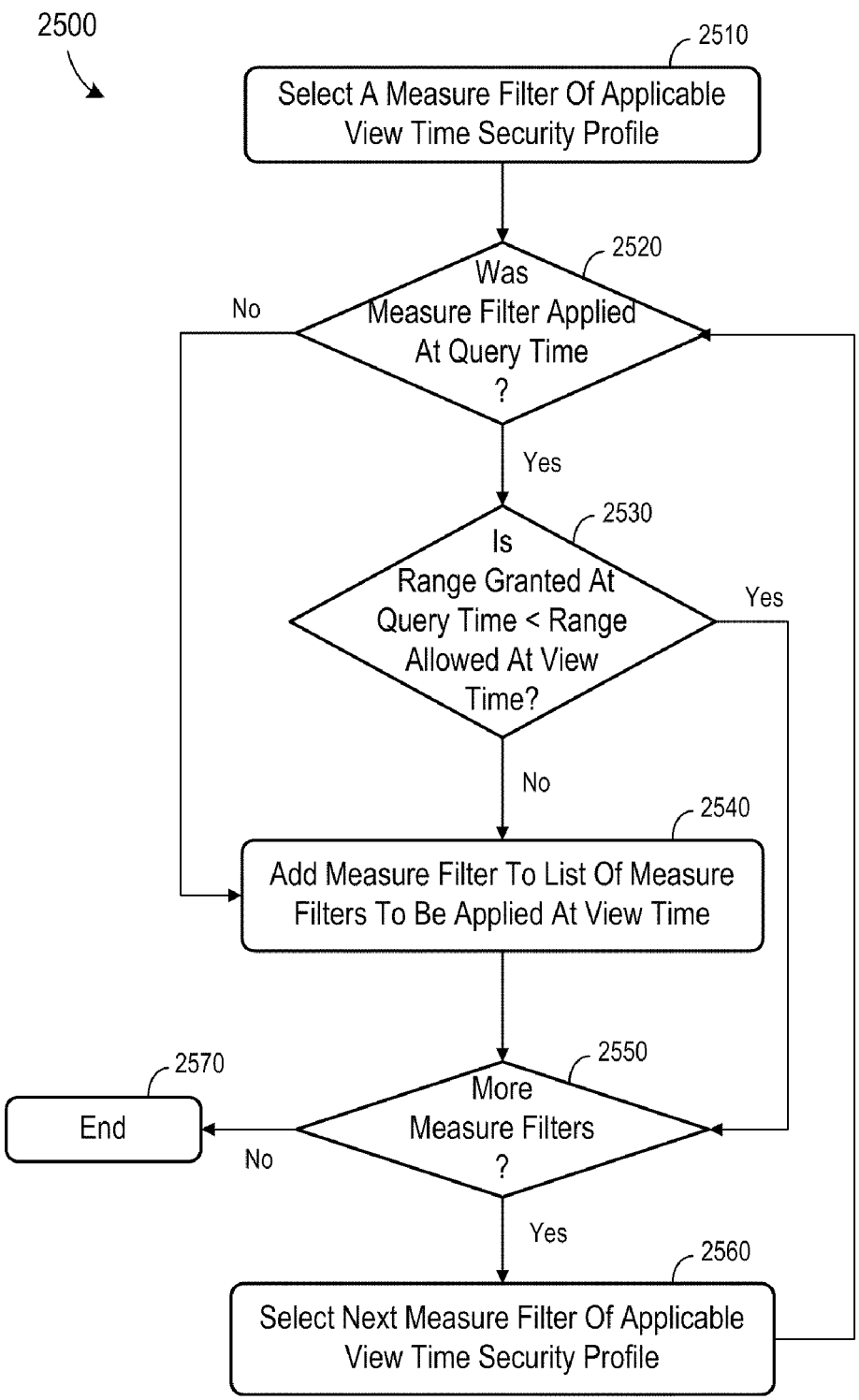
FIG. 25 is a flow diagram of a process according to some embodiments.

FIGS. 24 and 25 illustrate processes to determine view-time security to be applied at 2350 according to some embodiments. The determinations are based on the already-applied query-time security. More specifically, FIG. 24 illustrates a process to determine view-time security filters for restricting dimension members (e.g., Geography=Country.France.children, Product={"High tech", "Food"}), while FIG. 25 illustrates a process to determine view-time filters for defining restrictions based on measure values (e.g., Revenue>100, Customers Number=10).

Process 2400 begins at 2405 to select a hierarchy associated with a query of the subject report document. In this regard, each dimension D=includes several hierarchies $H_1, \ldots H_n$. A geographical dimension, for example, may include a level-based hierarchy H of the three levels Continent, Country, City.

Next, at 2410, an aggregated member set of the hierarchy is determined. This aggregated member set is a member set that was granted by a business security profile or functional filter applied at query-time. For example, the aggregated member set may include Europe.France.self, Europe.France.descendants, and Africa.Reunion.self. In some embodiments, each expression must begin with the full qualified name of a member in H of D and must end with a function. Possible functions are self, children and descendants.

The aggregated member set M=Europe.France.self+Europe.France.children+Africa.descendants indicates the union of members specified by each expression. M of the present example therefore indicates France itself, all French cities, all African countries and all African cities.

An aggregated member set of the hierarchy that is allowed at view-time is then determined at 2415. The aggregated member set determined at 2415 is based on security profiles assigned to the user and to the groups to which the user belongs.

A first sum of minimal expressions is generated at 2420 based on the aggregated member set determined at 2410. According to some embodiments, the first sum is generated such that each expression in the sum is minimal. An expression is considered minimal if the set of members it specifies is minimal for set inclusion. For example, in the sum of expressions Europe.France.children+Europe.descendants, the first term is not minimal because it is included by the second term.

Set inclusion defines a partial order for the hierarchical expressions of a sum. This partial order can be solved without knowledge of the content of the dimension stored in the associated data source. For example, the order Europe.descendants>Europe.children>Europe.France.children>Europe.France.Paris.self may be determined by first comparing a Fully Qualified Name defining the members.

The following rules may apply to define a complete relation order:

FQN.descendants>FQN.QN.self
FQN.descendants>FQN.children
FQN.descendants>FQN.QN.children
FQN.children>FQN.MEMBER.self, where FQN is a fully qualified name, QN is a qualified name, and MEMBER is a single member. For example, Europe.France.descendants>Europe.France.Paris.self corresponds to the first rule, with FQN=Europe.France and QN=Paris.

A unique normal form may be obtained by sorting the minimal expressions according to the above lexicographic order. Accordingly, 2420 may comprise normalizing the aggregated member set determined at 2410 by generating the first sum of minimal expressions and sorting the expressions as described above.

Similarly, at 2425, a second sum of minimal expressions is generated based on the aggregated member set determined at 2415. The second sum of minimal expressions may be normalized by sorting the minimal expressions according to lexicographic order.

Generally, the view-time dimension filter for the subject hierarchy is determined based on the intersection of the already-applied query-time dimension filter with the aggregated view-time dimension filter. Therefore, an intersection of the first sum of minimal expressions and the second sum of minimal expressions is determined at 2430. If the intersection is determined at 2435 to be simply equal to the first sum (representing the already-applied query-time security, it is determined at 2440 that no further filtering is required at view-time (e.g., at 2350 of process 2300). If the intersection is determined to be equal to zero at 2445, it is determined at 2450 to filter the data on a default member of the hierarchy.

Finally, if the intersection is neither equal to the first sum of minimal expressions nor to zero, it is determined at 2455 that the intersection itself is the dimension filter to be applied at view-time. Next, at 2460, it is determined whether the query includes more hierarchies. If so, flow continues to 2465 to select a next hierarchy of the query and returns to 2410 to proceed as described above with respect to the next hierarchy. If not, flow terminates at 2470.

Process 2500 provides determination of measure filters to be applied at 2350 according to some embodiments. The determination is based on the measure filters already-applied at query-time and the measure filters to be enforced at view-time based on an applicable security profile.

First, a measure filter of the applicable security profile is selected at 2510. Next, at 2520, it is determined whether the measure filter was applied at query-time. If not, flow continues to 2540 to add the selected measure filter to a list of measure filters to be applied at view time. If the measure filter was applied at query-time, the range of the filter granted at query-time is compared at 2530 against the range of the filter allowed at view-time. If the granted range (e.g., revenue<100) is not smaller than the allowed range (e.g., revenue<50), the selected measure filter (i.e., revenue<50) is added to the list of measure filters at 2540. Flow proceeds from 2530 to 2550 if the granted range is smaller than the allowed range.

At 2550, it is determined whether the applicable security profile includes more measure filters. If so, flow continues to 2560 to select a next measure filter of the applicable security profile query and returns to 2520 to proceed as described above with respect to the next measure filter. If the applicable security profile does not include more measure filters, flow terminates at 2570.

After presenting a secured set of report data at 2350 based on dimension filters and measure filters that may have been determined as described above, information engine 2110 may receive a request from the user to refresh the report data at 2360. Refreshing the report data involves re-executing the queries of the report. For clarity, it will be assumed that the report includes only one query, but embodiments are not limited thereto.

The report query is executed at 2370. In some embodiments, data of a requested report is automatically refreshed prior to presenting any data to the user (i.e., flow proceeds directly from 2330 to 2370). As described above with respect to 2070, information engine 2110 transforms the object-based query to a lower-level query of the underlying hierarchical data structure(s) based on mappings associated with the objects of the query. The lower-level query is secured by the effective query-time restrictions associated with the user. These query-time restrictions are specified in the data security profile(s) associated with the user and the current universe, and may also include query-time restrictions specified in the business security profile(s) associated with the user and the current universe.

At 2380, information engine 2110 receives data in response to execution of the query. View-time security is applied to the received data based on the business security profile(s) retrieved at 2320 to determine a set of data which the user is allowed to view, and the secured set of data is presented to the user at 2390.

As mentioned above, a user may be associated with two or more data security profiles and/or business security profiles for a given universe. For example, the user may belong to different groups that are assigned different data security profiles and/or business security profiles. The user may belong to a group which in turn belongs to another group, each of which is associated with a unique data security profile and/or business security profile. Moreover, the user may be explicitly assigned to a data security profile and/or business security profile.

In view of the foregoing, embodiments may employ any suitable aggregation rules to compute the effective security parameters to apply to the current user. Such rules may be based on respective priorities of the applicable security profiles (e.g., "use the data security profile having the highest priority"), or on "Very restrictive", "Moderately restrictive" and "Less restrictive" algorithms and their adaptations.

For example, as mentioned above, respective priorities may be used to aggregate Connection and Table Mapping parameters of competing data security profiles. "Very restrictive", "Moderately restrictive" and "Less restrictive" algorithms may be used to aggregate Rows, Controls, and SQL parameters of data security profiles and all business security profile parameters. Each algorithm may be performed with different operators (e.g., AND/OR, MIN/MAX, Intersection/Union) depending on the type of business security profile parameters to be aggregated.

Embodiments described herein are solely for the purpose of illustration. Those in the art will recognize other embodiments may be practiced with modifications and alterations to that described above.

What is claimed is:

1. A computer-implemented method comprising:
   determining a first security profile associated with a user and an information space, the information space comprising metadata indicating a plurality of objects mapped to logical entities of a hierarchical data structure;
   receiving a request from the user for an interface for creating queries to the hierarchical data structure;
   determining, based on the first security profile, a first subset of the plurality of objects based on which the user is allowed to create queries;
   presenting, to the user, the first subset of the plurality of objects that is determined based on the first security profile;
   receiving a query after the presenting the first subset of the plurality of objects to the user;
   executing the query based on one or more of the first subset of objects;
   receiving data of the hierarchical data structure in response to execution of the query;
   determining, based on the first security profile, a second subset of the received data which the user is allowed to view; and
   presenting the second subset of the received data to the user.

2. A computer-implemented method according to claim 1, wherein executing the query comprises:
   modifying the query based on the first security profile such that the received data is identical to the second subset of the received data which the user is allowed to view; and
   executing the modified query.

3. A computer-implemented method according to claim 2, further comprising:
   determining a second security profile associated with the user and with a logical database schema associated with the hierarchical data structure,
   wherein modifying the query comprises:
   modifying the query based on the second security profile.

4. A computer-implemented method according to claim 1, further comprising:
   determining a second security profile associated with the user and with a logical database schema associated with the hierarchical data structure,
   wherein executing the query comprises:
   modifying the query based on the second security profile; and
   executing the modified query.

5. A computer-implemented method according to claim 1, further comprising:
   storing the query and the received data in a report;
   determining a second security profile associated with a second user and the information space;
   receiving a request for the report from the second user;
   determining, based on the second security profile, a third subset of the received data which the second user is allowed to view, the third subset of the received data being different from the second subset; and
   presenting the third subset of the received data to the second user.

6. A computer-implemented method according to claim 1, further comprising:
   storing the query and the received data in a report;
   determining a second security profile associated with a second user and the information space;
   receiving a request for the report from the second user;
   re-executing the query based on the one or more of the first subset of objects;
   receiving second data of the hierarchical data structure in response to re-execution of the query;
   determining, based on the second security profile, a third subset of the received second data which the second user is allowed to view, the third subset of the received second data being different from the second subset of received data; and
   presenting the third subset of the received second data to the second user.

7. A computer-implemented method according to claim 6, wherein re- executing the query comprises:
   modifying the query based on the second security profile such that the received second data is identical to the third subset of the received second data which the second user is allowed to view; and
   executing the modified query.

8. A computer-implemented method comprising:
- determining a first security profile associated with a user and an information space, the information space comprising metadata indicating a plurality of objects mapped to logical entities of a hierarchical data structure;
- receiving a request from the user for a stored report that includes a query and report data that includes data resulting from execution of the query;
- re-executing the query that is included in the stored report requested by the user;
- receiving data of the hierarchical data structure in response to re-execution of the query;
- determining, based on the first security profile, a subset of the received data which the user is allowed to view; and
- presenting the subset of the received data to the user.

9. A computer-implemented method according to claim 8, wherein re-executing the query comprises:
- modifying the query based on the first security profile such that the received data is identical to the subset of the received data which the user is allowed to view; and
- executing the modified query.

10. A computer-implemented method according to claim 9, further comprising:
- determining a second security profile associated with the user and with a logical database schema associated with the hierarchical data structure,
- wherein modifying the query comprises:
- modifying the query based on the second security profile.

11. A computer-implemented method according to claim 8, further comprising:
- prior to re-executing the query, determining security constraints under which the report data was retrieved;
- prior to re-executing the query, determining, based on the first security profile, a second subset of the report data which the user is allowed to view; and
- prior to re-executing the query, presenting the second subset of the report data to the user.

12. A computer-implemented method according to claim 8, further comprising:
- determining a second security profile associated with the user and with a logical database schema associated with the hierarchical data structure,
- wherein re-executing the query comprises:
- modifying the query based on the second security profile; and
- executing the modified query.

13. A tangible computer-readable medium having stored thereon program code, the program code executable by a computer to:
- determine a first security profile associated with a user and an information space, the information space comprising metadata indicating a plurality of objects mapped to logical entities of a hierarchical data structure;
- receive a request from the user for an interface for creating queries to the hierarchical data structure;
- determine, based on the first security profile, a first subset of the plurality of objects based on which the user is allowed to create queries;
- present, to the user, the first subset of the plurality of objects that is determined based on the first security profile;
- receive a query after presentation of the first subset of the plurality of objects to the user;
- execute the query based on one or more of the first subset of objects;
- receive data of the hierarchical data structure in response to execution of the query;
- determine, based on the first security profile, a second subset of the received data which the user is allowed to view; and
- present the second subset of the received data to the user.

14. A medium according to claim 13, wherein the program code executable by a computer to execute the query comprises program code executable by a computer to:
- modify the query based on the first security profile such that the received data is identical to the second subset of the received data which the user is allowed to view; and
- execute the modified query.

15. A medium according to claim 13, wherein the program code is further executable by a computer to:
- store the query and the received data in a report;
- determine a second security profile associated with a second user and the information space;
- receive a request for the report from the second user;
- determine, based on the second security profile, a third subset of the received data which the second user is allowed to view, the third subset of the received data being different from the second subset; and
- present the third subset of the received data to the second user.

16. A medium according to claim 13, wherein the program code is further executable by a computer to:
- store the query and the received data in a report;
- determine a second security profile associated with a second user and the information space;
- receive a request for the report from the second user;
- re-execute the query based on the one or more of the first subset of objects;
- receive second data of the hierarchical data structure in response to re-execution of the query;
- determine, based on the second security profile, a third subset of the received second data which the second user is allowed to view, the third subset of the received second data being different from the second subset of received data; and
- present the third subset of the received second data to the second user.

17. A tangible computer-readable medium having stored thereon program code, the program code executable by a computer to:
- determine a first security profile associated with a user and an information space, the information space comprising metadata indicating a plurality of objects mapped to logical entities of a hierarchical data structure;
- receive a request from the user for a stored report that includes a query and report data that includes data resulting from execution of the query;
- re-execute the query that is included in the stored report requested by the user;
- receive data of the hierarchical data structure in response to re-execution of the query;
- determine, based on the first security profile, a subset of the received data which the user is allowed to view; and
- present the subset of the received data to the user.

18. A medium according to claim 17, wherein the program code executable by a computer to re-execute the query comprises program code executable by a computer to:
- modify the query based on the first security profile such that the received data is identical to the subset of the received data which the user is allowed to view; and
- execute the modified query.

19. A medium according to claim 17, the program code further executable by a computer to:
- determine, prior to re-executing the query, security constraints under which the report data was retrieved;
- determine, prior to re-executing the query and based on the first security profile, a second subset of the report data which the user is allowed to view; and
- present, prior to re-executing the query, the second subset of the report data to the user.

20. A system comprising:
- a storage device to store metadata of an information space and one or more security profiles associated with the information space, the metadata indicating a plurality of objects mapped to logical entities of a hierarchical data structure; and
- an information engine to:
  - determine a first security profile of the one or more security profiles associated with a user and the information space;
  - receive a request from the user for an interface for creating queries to the hierarchical data structure;
  - determine, based on the first security profile, a first subset of the plurality of objects based on which the user is allowed to create queries;
  - present, to the user, the first subset of the plurality of objects that is determined based on the first security profile;
  - receive a query after presentation of the first subset of the plurality of objects to the user;
  - execute the query based on one or more of the first subset of objects;
  - receive data of the hierarchical data structure in response to execution of the query;
  - determine, based on the first security profile, a second subset of the received data which the user is allowed to view; and
  - present the second subset of the received data to the user.

21. A system according to claim 20, wherein to execution of the query comprises:
- modification of the query based on the first security profile such that the received data is identical to the second subset of the received data which the user is allowed to view; and
- execution of the modified query.

22. A system according to claim 20, the information engine further to:
- store the query and the received data in a report;
- determine a second security profile associated with a second user and the information space;
- receive a request for the report from the second user;
- determine, based on the second security profile, a third subset of the received data which the second user is allowed to view, the third subset of the received data being different from the second subset; and
- present the third subset of the received data to the second user.

23. A system according to claim 20, the information engine further to:
- store the query and the received data in a report;
- determine a second security profile associated with a second user and the information space;
- receive a request for the report from the second user;
- re-execute the query based on the one or more of the first subset of objects;
- receive second data of the hierarchical data structure in response to re-execution of the query;
- determine, based on the second security profile, a third subset of the received second data which the second user is allowed to view, the third subset of the received second data being different from the second subset of received data; and
- present the third subset of the received second data to the second user.

24. A system comprising:
- a storage device to store metadata of an information space and one or more security profiles associated with the information space, the metadata indicating a plurality of objects mapped to logical entities of a hierarchical data structure; and
- an information engine to:
  - determine a first security profile associated with a user and the information space;
  - receive a request from the user for a stored report that includes a query and report data that includes data resulting from execution of the query;
  - re-execute the query that is included in the stored report requested by the user;
  - receive data of the hierarchical data structure in response to re-execution of the query;
  - determine, based on the first security profile, a subset of the received data which the user is allowed to view; and
  - present the subset of the received data to the user.

25. A system according to claim 24, wherein re-execution of the query comprises:
- modification of the query based on the first security profile such that the received data is identical to the subset of the received data which the user is allowed to view; and
- execution of the modified query.

26. A system according to claim 24, the information engine further to:
- determine, prior to re-executing the query, security constraints under which the report data was retrieved;
- determine, prior to re-executing the query and based on the first security profile, a second subset of the report data which the user is allowed to view; and
- present, prior to re-executing the query, the second subset of the report data to the user.

27. A computer-implemented method comprising:
- determining a first security profile associated with a user and an information space, the information space comprising metadata indicating a plurality of objects mapped to logical entities of a hierarchical data structure;
- receiving a request from the user for an interface for creating queries to the hierarchical data structure;
- determining, based on the first security profile, a first subset of the plurality of objects based on which the user is allowed to create queries;
- executing a query based on one or more of the first subset of objects;
- receiving data of the hierarchical data structure in response to execution of the query;
- determining, based on the first security profile, a second subset of the received data which the user is allowed to view; and
- presenting the second subset of the received data to the user;

wherein executing the query comprises:
    modifying the query based on the first security profile such that the received data is identical to the second subset of the received data which the user is allowed to view; and
    executing the modified query;
the method further comprising:
    determining a second security profile associated with the user and with a logical database schema associated with the hierarchical data structure,
    wherein modifying the query comprises:
        modifying the query based on the second security profile.

28. A computer-implemented method comprising:
determining a first security profile associated with a user and an information space, the information space comprising metadata indicating a plurality of objects mapped to logical entities of a hierarchical data structure;
receiving a request from the user for an interface for creating queries to the hierarchical data structure;
determining, based on the first security profile, a first subset of the plurality of objects based on which the user is allowed to create queries;
executing a query based on one or more of the first subset of objects;
receiving data of the hierarchical data structure in response to execution of the query;
determining, based on the first security profile, a second subset of the received data which the user is allowed to view;
presenting the second subset of the received data to the user; and
determining a second security profile associated with the user and with a logical database schema associated with the hierarchical data structure,
wherein executing the query comprises:
    modifying the query based on the second security profile; and
    executing the modified query.

29. A computer-implemented method comprising:
determining a first security profile associated with a user and an information space, the information space comprising metadata indicating a plurality of objects mapped to logical entities of a hierarchical data structure;
receiving a request from the user for an interface for creating queries to the hierarchical data structure;
determining, based on the first security profile, a first subset of the plurality of objects based on which the user is allowed to create queries;
executing a query based on one or more of the first subset of objects;
receiving data of the hierarchical data structure in response to execution of the query;
determining, based on the first security profile, a second subset of the received data which the user is allowed to view;
presenting the second subset of the received data to the user;
storing the query and the received data in a report;
determining a second security profile associated with a second user and the information space;
receiving a request for the report from the second user;
re-executing the query based on the one or more of the first subset of objects;
receiving second data of the hierarchical data structure in response to re-execution of the query;
determining, based on the second security profile, a third subset of the received second data which the second user is allowed to view, the third subset of the received second data being different from the second subset of received data; and
presenting the third subset of the received second data to the second user.

30. A computer-implemented method according to claim 29, wherein re-executing the query comprises:
modifying the query based on the second security profile such that the received second data is identical to the third subset of the received second data which the second user is allowed to view; and
executing the modified query.

31. A computer-implemented method comprising:
determining a first security profile associated with a user and an information space, the information space comprising metadata indicating a plurality of objects mapped to logical entities of a hierarchical data structure;
receiving a request from the user for a report including a query and report data;
executing the query;
receiving data of the hierarchical data structure in response to execution of the query;
determining, based on the first security profile, a subset of the received data which the user is allowed to view; and
presenting the subset of the received data to the user;
wherein executing the query comprises:
    modifying the query based on the first security profile such that the received data is identical to the subset of the received data which the user is allowed to view; and
    executing the modified query;
the method further comprising:
    determining a second security profile associated with the user and with a logical database schema associated with the hierarchical data structure,
    wherein modifying the query comprises:
        modifying the query based on the second security profile.

32. A tangible computer-readable medium having stored thereon program code, the program code executable by a computer to:
determine a first security profile associated with a user and an information space, the information space comprising metadata indicating a plurality of objects mapped to logical entities of a hierarchical data structure;
receive a request from the user for an interface for creating queries to the hierarchical data structure;
determine, based on the first security profile, a first subset of the plurality of objects based on which the user is allowed to create queries;
execute a query based on one or more of the first subset of objects;
receive data of the hierarchical data structure in response to execution of the query;
determine, based on the first security profile, a second subset of the received data which the user is allowed to view;
present the second subset of the received data to the user;
store the query and the received data in a report;
determine a second security profile associated with a second user and the information space;

receive a request for the report from the second user;
re-execute the query based on the one or more of the first subset of objects;
receive second data of the hierarchical data structure in response to re-execution of the query;
determine, based on the second security profile, a third subset of the received second data which the second user is allowed to view, the third subset of the received second data being different from the second subset of received data; and
present the third subset of the received second data to the second user.

33. A system comprising:
a storage device to store metadata of an information space and one or more security profiles associated with the information space, the metadata indicating a plurality of objects mapped to logical entities of a hierarchical data structure; and
an information engine to:
  determine a first security profile of the one or more security profiles associated with a user and the information space;
  receive a request from the user for an interface for creating queries to the hierarchical data structure;
  determine, based on the first security profile, a first subset of the plurality of objects based on which the user is allowed to create queries;
  execute a query based on one or more of the first subset of objects;
  receive data of the hierarchical data structure in response to execution of the query;
  determine, based on the first security profile, a second subset of the received data which the user is allowed to view;
  present the second subset of the received data to the user;
  store the query and the received data in a report;
  determine a second security profile associated with a second user and the information space;
  receive a request for the report from the second user;
  re-execute the query based on the one or more of the first subset of objects;
  receive second data of the hierarchical data structure in response to re-execution of the query;
  determine, based on the second security profile, a third subset of the received second data which the second user is allowed to view, the third subset of the received second data being different from the second subset of received data; and
  present the third subset of the received second data to the second user.

* * * * *